U S009086132B2

(12) United States Patent
Adachi et al.

(10) Patent No.: US 9,086,132 B2
(45) Date of Patent: Jul. 21, 2015

(54) VEHICLE TRANSMISSION

(71) Applicant: HONDA MOTOR CO., LTD., Tokyo (JP)

(72) Inventors: Jun Adachi, Wako (JP); Jun Miyazaki, Wako (JP); Masaki Nakagawara, Wako (JP); Yoshiaki Tsukada, Wako (JP); Takashi Ozeki, Wako (JP); Hiroshi Takamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 13/768,007

(22) Filed: Feb. 15, 2013

(65) Prior Publication Data

US 2013/0255415 A1 Oct. 3, 2013

(30) Foreign Application Priority Data

| Mar. 30, 2012 | (JP) | 2012-082442 |
| Mar. 30, 2012 | (JP) | 2012-082443 |
| Sep. 19, 2012 | (JP) | 2012-205673 |

(51) Int. Cl.
| *F16H 63/08* | (2006.01) |
| *F16H 59/04* | (2006.01) |
| *F16D 23/12* | (2006.01) |
| *F16H 63/14* | (2006.01) |
| *F16H 63/46* | (2006.01) |

(52) U.S. Cl.
CPC .............. *F16H 59/042* (2013.01); *F16D 23/12* (2013.01); *F16H 63/14* (2013.01); *F16H 63/46* (2013.01); *F16D 2023/123* (2013.01); *Y10T 74/19251* (2013.01); *Y10T 74/19279* (2013.01)

(58) Field of Classification Search
CPC ......... F16H 63/14; F16H 63/20; F16H 63/30; F16H 23/02; F16H 2023/123; F16H 63/3069; F16H 59/10; F16H 63/46

USPC ............... 74/335, 337.5, 473.24, 473.19; 192/3.61, 3.62, 3.63, 3.51, 3.54; 477/70, 79
See application file for complete search history.

(56) References Cited

U.S. PATENT DOCUMENTS

| 5,404,774 A * | 4/1995 | Bond ........................... 81/180.1 |
| 6,443,278 B1 * | 9/2002 | Hori et al. .................... 192/3.58 |
| 6,619,450 B2 * | 9/2003 | Ota et al. ..................... 192/3.56 |

(Continued)

FOREIGN PATENT DOCUMENTS

JP 2001-280493 A 10/2001

*Primary Examiner* — William Kelleher
*Assistant Examiner* — Thomas Magnuson
(74) *Attorney, Agent, or Firm* — Birch, Stewart, Kolasch & Birch, LLP

(57) ABSTRACT

A vehicle transmission wherein a single shift spindle is provided with a master arm to operate the transmission via an accumulation mechanism and a clutch lever to operate a clutch, capable of more reliably realizing disconnection of the clutch after the completion of accumulation necessary for a shift operation. A vehicle transmission includes a master arm provided on a shift spindle for transmitting a rotational force to a shift drum of a transmission to rotate and operate the shift drum with a clutch lever provided on the shift spindle, to operate the clutch. An accumulation mechanism is capable of accumulating the rotational force transmitted from the shift spindle to the master arm. The master arm and the clutch lever are interlocked with each other. A delay mechanism is provided that delays the clutch disconnection operation with the clutch lever before accumulation is completed between the shift spindle and the clutch.

18 Claims, 34 Drawing Sheets

(56) References Cited

U.S. PATENT DOCUMENTS

| | | | |
|---|---|---|---|
| 6,802,794 B2 * | 10/2004 | Showalter | 475/269 |
| 7,617,904 B1 * | 11/2009 | Einboeck et al. | 180/336 |
| 7,635,054 B2 * | 12/2009 | Kosugi et al. | 192/20 |
| 7,779,977 B2 * | 8/2010 | Chen et al. | 192/3.56 |
| 2010/0081547 A1 * | 4/2010 | Kobayashi et al. | 477/156 |
| 2010/0242655 A1 * | 9/2010 | Ieda et al. | 74/473.1 |
| 2011/0065538 A1 * | 3/2011 | Terada et al. | 474/111 |
| 2011/0314961 A1 * | 12/2011 | Tanaka et al. | 74/665 E |

\* cited by examiner

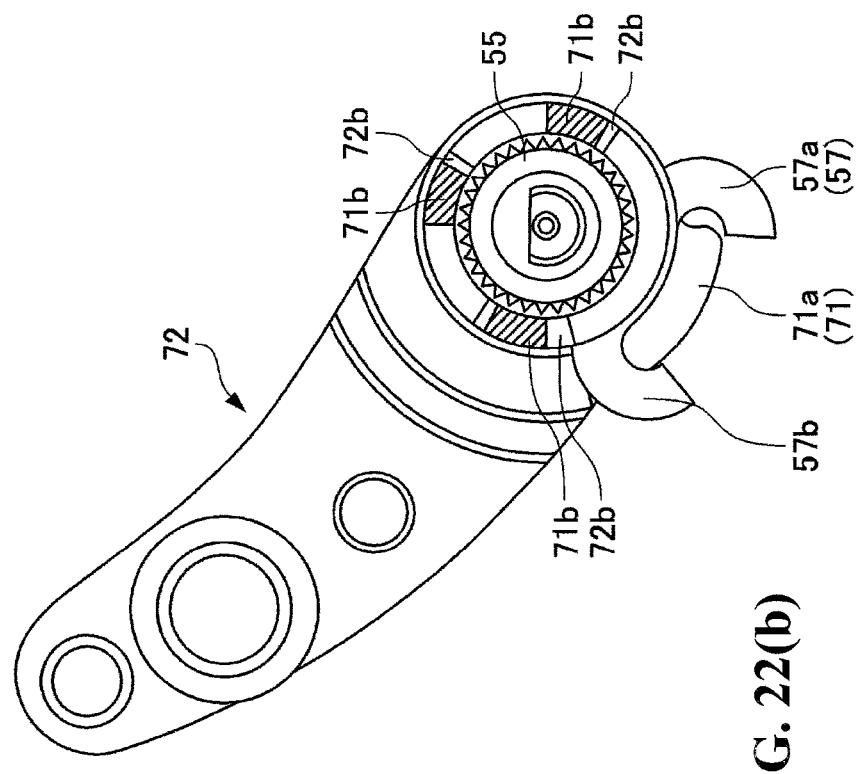
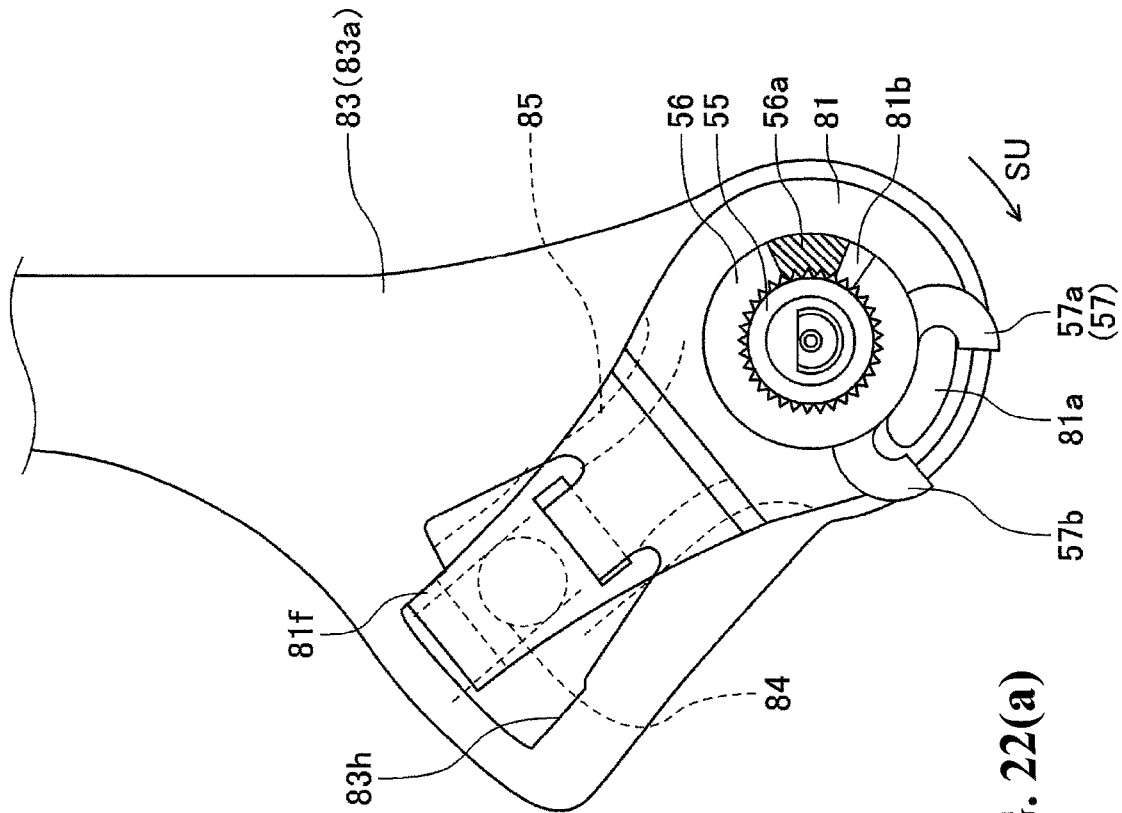
FIG. 22(b)
FIG. 22(a)

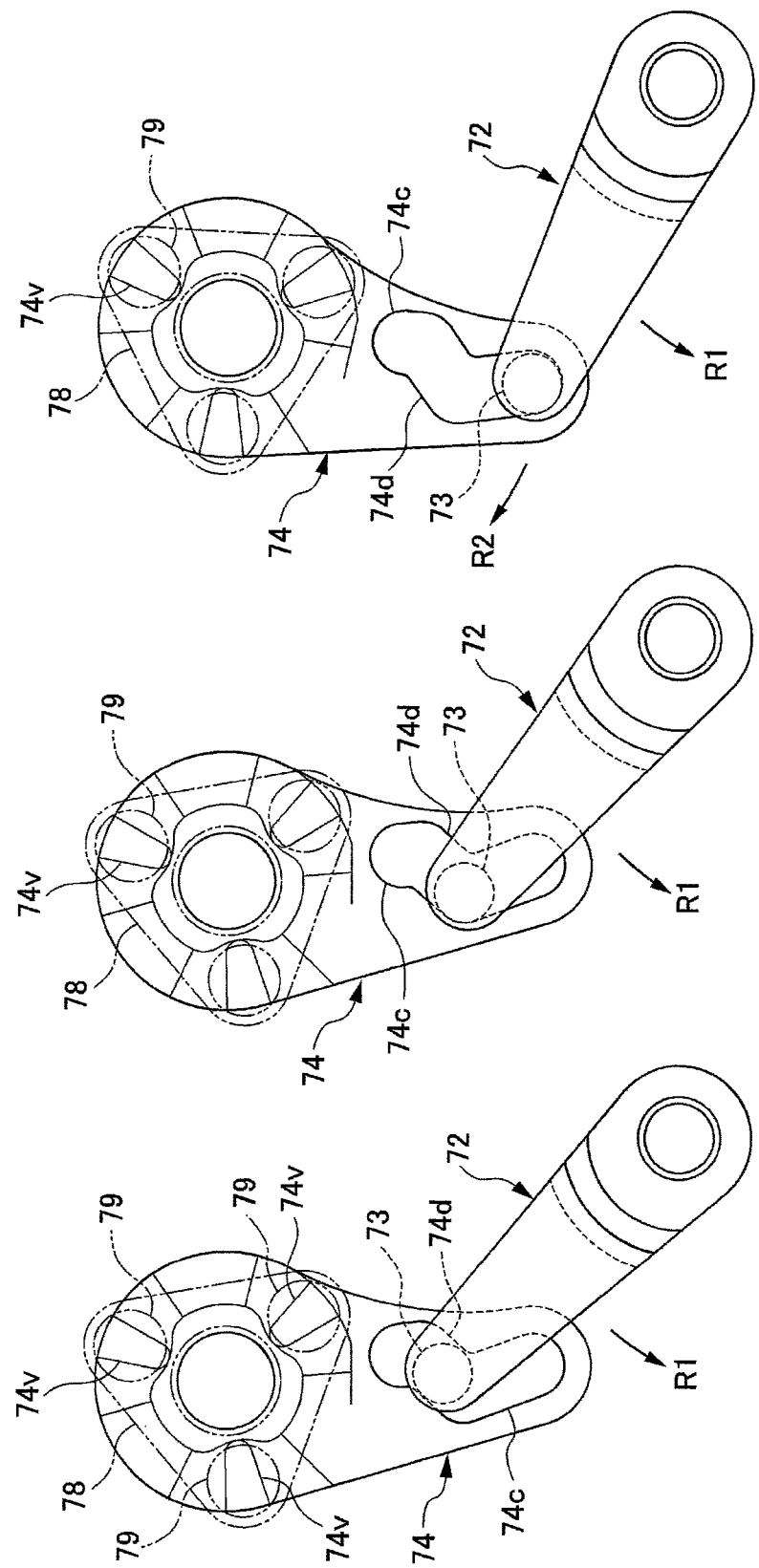

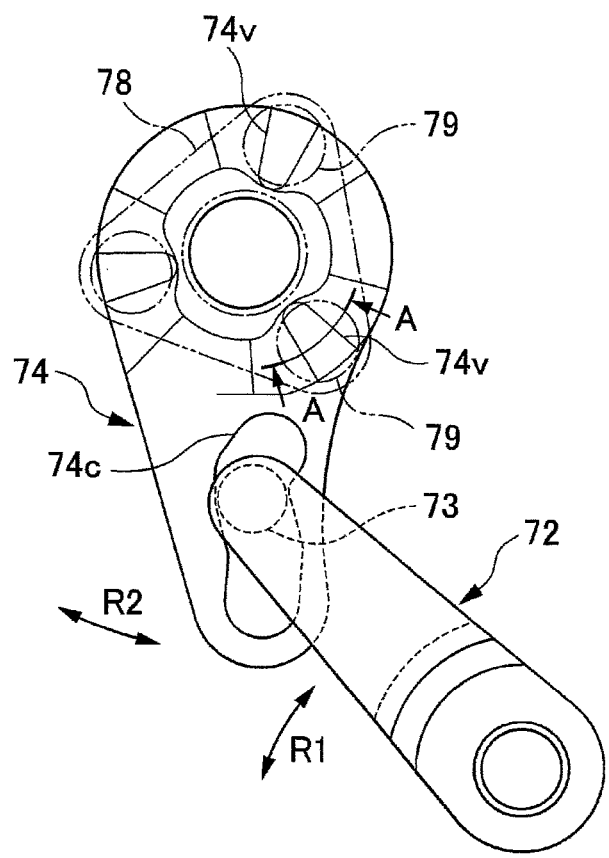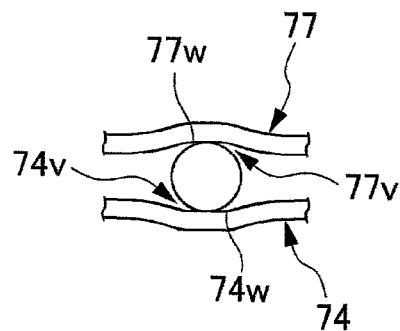
FIG. 29(a)                    FIG. 29(b)

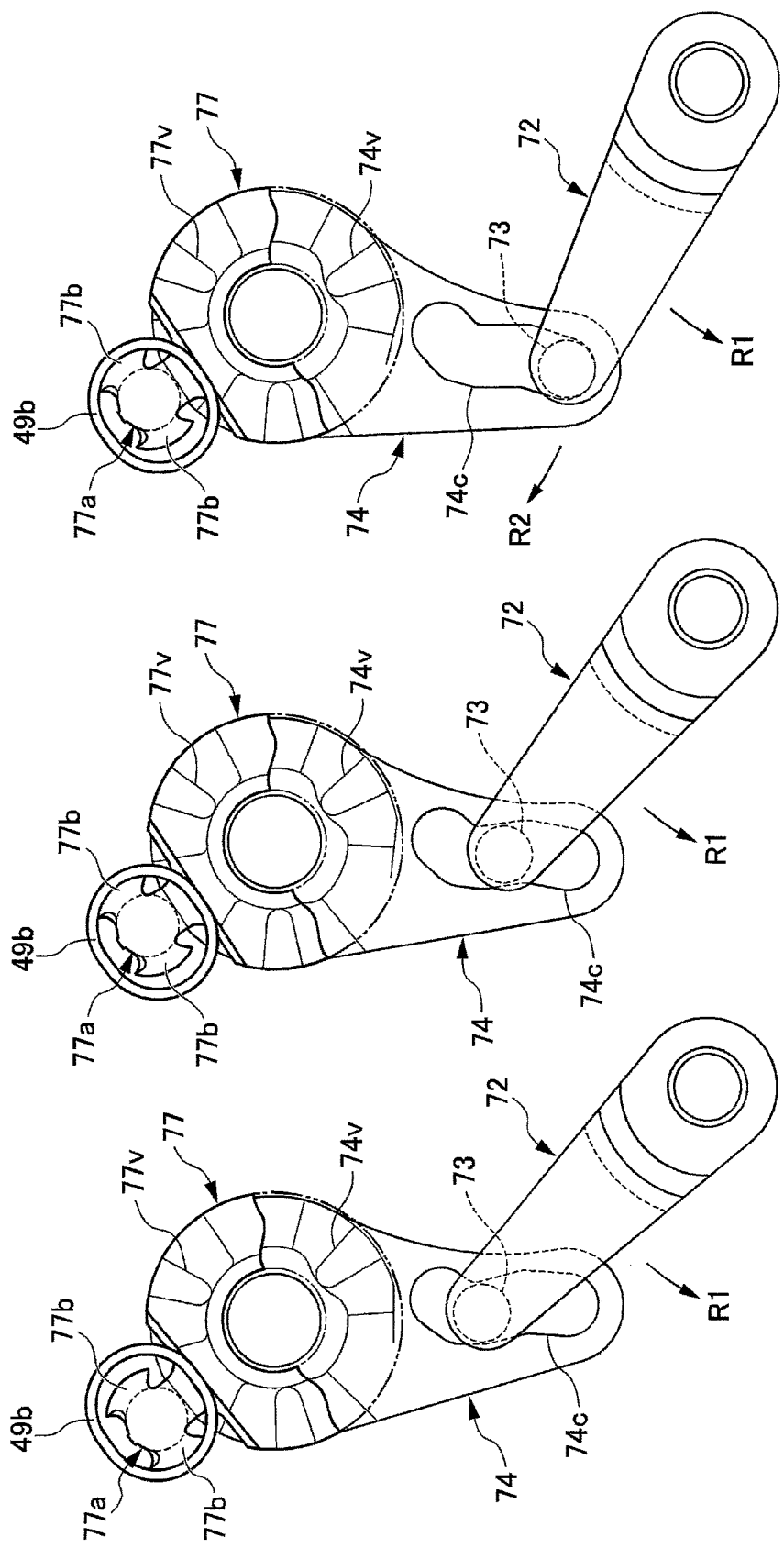

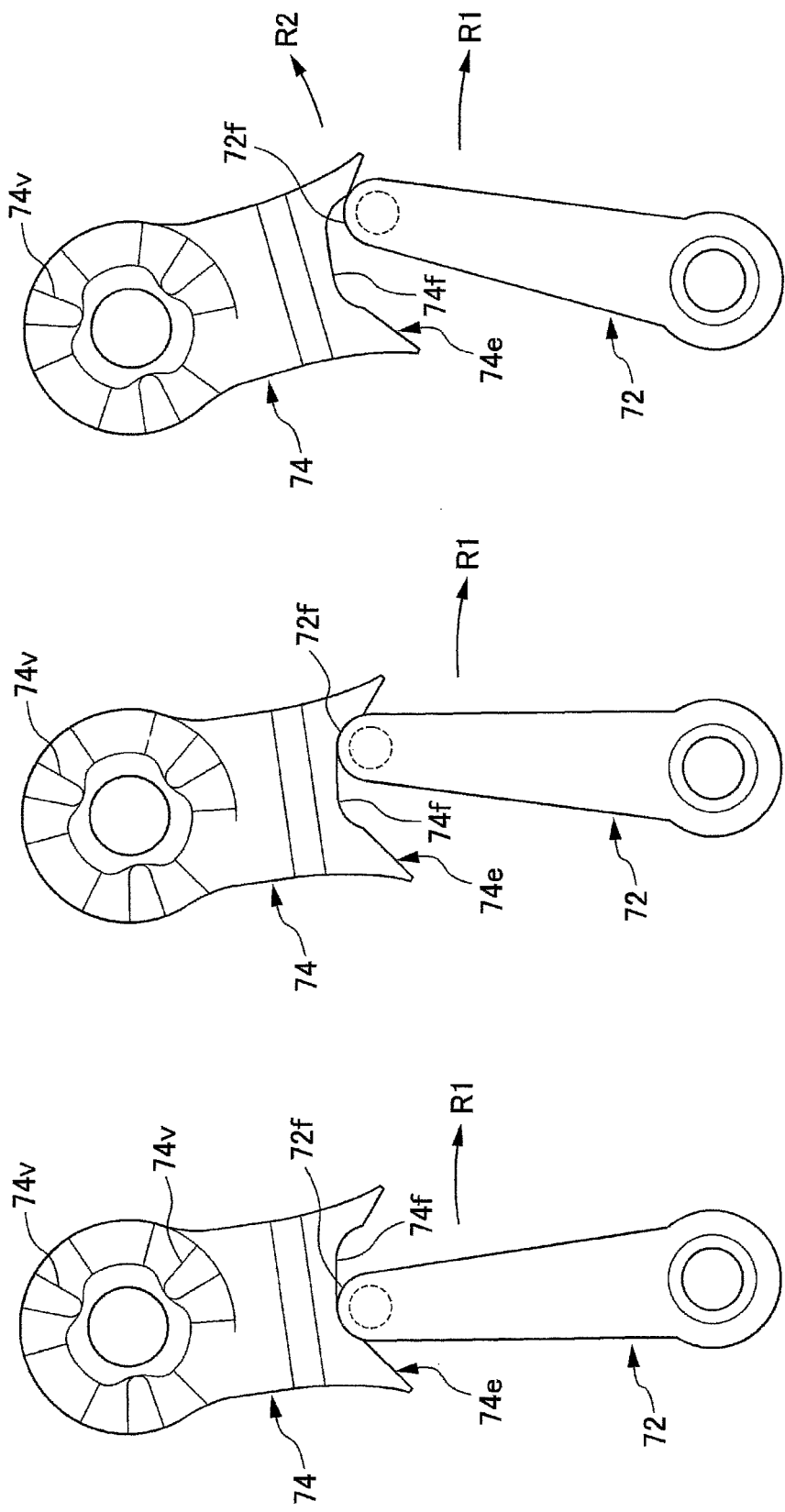

VEHICLE TRANSMISSION

CROSS-REFERENCE TO RELATED APPLICATIONS

The present application claims priority under 35 USC 119 to Japanese Patent Application No. 2012-082443 filed Mar. 30, 2012; Japanese Patent Application No. 2012-205673 filed Sep. 19, 2012 and Japanese Patent Application No. 2012-082442 filed Mar. 30, 2012 the entire contents of which are hereby incorporated by reference.

BACKGROUND OF THE INVENTION

1. Field of the Invention

The present invention relates to a vehicle clutch-interlock transmission.

2. Description of Background Art

JP-A No. 2001-280493 discloses, as a vehicle clutch-interlock transmission, a structure where one (single) shift spindle is provided with a master arm to operate a transmission via an accumulation mechanism and a clutch lever to operate a clutch. In the accumulation mechanism, the master arm is supported rotatably with respect to the shift spindle. The clutch lever is fixed to the shift spindle. Further, a sub arm is fixed to the shift spindle, and a preload spring exists between the master arm and the sub arm. According to this structure, it is possible to rotate the clutch lever while accumulating a force to operate the transmission and rotating strokes (accumulating) in the master arm with the preload spring between the master arm and the sub arm. Then, when the accumulation sufficient to operate the transmission has been completed in the preload spring (a rotational angle of the shift spindle at this time is also referred to as an "accumulation completion angle"), the clutch is disconnected and the accumulation for the master arm is released, then it is possible to quickly perform gear change.

However, in the transmission in JP-A No. 2001-280493, as the sub arm and the clutch lever are respectively fixed to the shift spindle, at the same time of the rotation of the shift spindle, the sub arm and the clutch lever also start rotating. Accordingly, the accumulation and the clutch operation with the preload spring are approximately simultaneously started.

However, in the transmission in JP-A No. 2001-280493, there is a probability of a disconnection of the clutch before completion of the accumulation in the master arm due to aging of the clutch and the like. In a case where the clutch is disconnected before the accumulation completion angle is established, since rotation strokes necessary for operation of the transmission are insufficient with the opened preload spring, it is necessary to wait for the rotation of the shift spindle to a predetermined angle. In this case, as the clutch-disconnected status is continued for a comparatively long time, the status where the driving force is released is prolonged.

SUMMARY AND OBJECTS OF THE INVENTION

The present invention has an object to provide a vehicle transmission with a master arm to operate a transmission via an accumulation mechanism and a clutch lever to operate a clutch in a single shift spindle, which more reliably realizes clutch disconnection after the completion of accumulation necessary for shift operation.

According to an embodiment of the present invention, a vehicle transmission includes a single shift spindle; a master arm, provided on the shift spindle, that transmits a rotational force of the shift spindle to a shift drum of the transmission to rotate and operate the shift drum; a clutch lever provided on the shift spindle to operate a clutch; and an accumulation mechanism capable of accumulation of the rotational force transmitted from the shift spindle to the master arm. The master arm and the clutch lever are interlocked with each other. The transmission further includes a delay mechanism that delays a disconnection operation of the clutch with the clutch lever until the accumulation is completed between the shift spindle and the clutch.

According to an embodiment of the present invention, the delay mechanism functions as a lost mechanism not to contribute a part of the rotational angle of the shift spindle to the disconnection operation of the clutch with the clutch lever.

According to an embodiment of the present invention, the clutch lever is rotatably supported by the shift spindle with a delay member fixed to the shift spindle. Further, the clutch lever and the delay member have a doweled tooth and a doweled hole linked to each other. Further, the delay mechanism is formed with a gap in a circumferential direction between the doweled tooth and the doweled hole.

According to an embodiment of the present invention, the delay mechanism is formed with backlash in a moving direction in a clutch lifter mechanism that performs disconnection of the clutch by moving with respect to the clutch.

According to an embodiment of the present invention, the shift spindle and the delay member integrally rotate.

According to an embodiment of the present invention, the accumulation mechanism is formed with a coiled spring, and is provided so as to directly cover a peripheral surface of the shift spindle.

According to an embodiment of the present invention, the clutch lever is linked to a clutch lifter cam that lifts the clutch to disconnect or connect it via a guide hole provided in the clutch lifter cam, and the delay mechanism is provided as a backlash hole of the guide hole.

According to an embodiment of the present invention, the clutch lever is linked to a clutch lifter cam that lifts the clutch to disconnect or connect it, and the clutch lifter cam has a plurality of valley-shaped slope plates linked to a clutch lifter plate via a ball-shaped member, further, the delay mechanism is provided as a flat part formed in the valley-shaped slope plate.

According to an embodiment of the present invention, the clutch lever is linked to a clutch lifter cam that lifts the clutch to disconnect or connect it, and the clutch lifter cam is linked to a clutch lifter plate via a ball-shaped member. Further, the clutch lifter plate has an anchor rotation-stopped with respect to the transmission. In addition, the delay mechanism is provided as an elliptic locking hole to lock the anchor.

According to an embodiment of the present invention, the clutch lever is linked with a clutch lifter cam that lifts the clutch to disconnect or connect it with a cam surface provided in the clutch lifter cam, and the delay mechanism is provided as an idle cam of the cam surface.

According to an embodiment of the present invention, the clutch lever is provided as a link mechanism to which a plurality of arm members are linked, and one arm member in the link mechanism has a stopper to limit a rotational angle of other arm member. Further, the delay mechanism is provided as a rotatable range for the respective arm members in the link mechanism.

According to an embodiment of the present invention, as it is possible to complete the accumulation before the clutch disconnection operation, it is possible to more reliably realize clutch disconnection after the completion of the accumulation necessary for shift operation. Accordingly, it is possible to more reliably and quickly perform shift operation after the clutch disconnection.

According to an embodiment of the present invention, the delay mechanism functions as a lost mechanism not to contribute a part of the rotational angle of the shift spindle to the clutch disconnection operation with the clutch lever. Accordingly, it is possible to easily perform the completion of the accumulation before clutch disconnection operation with the lost mechanism.

According to an embodiment of the present invention, the accumulation collar as the clutch lever and the delay member has mutually linked second doweled tooth and second doweled hole. The delay mechanism is formed with gaps between the second doweled tooth and the second doweled hole in a circumferential direction. Accordingly, the delay mechanism has a compact and simple structure.

According to an embodiment of the present invention, the delay mechanism is formed with backlash in a moving direction of the clutch lifter mechanism which performs the clutch disconnection by moving with respect to the clutch. Accordingly, the delay mechanism has a simple structure.

According to an embodiment of the present invention, the shift spindle and the delay member are rotated integrally. Accordingly, when the shift spindle rotates, it is possible to quickly rotate the master arm via the delay member, the accumulation mechanism and the like.

According to an embodiment of the present invention, the accumulation mechanism is formed with a coiled spring, and is provided so as to directly cover the peripheral surface of the shift spindle. Accordingly, the accumulation mechanism has a compact structure.

According to an embodiment of the present invention, the delay mechanism is provided as a backlash hole of the guide hole. Accordingly, it is possible to increase the size of the guide hole (especially it is possible to prolong the guide length). Accordingly, it is possible to easily set and manage the accuracy of a delay function of the delay mechanism.

According to an embodiment of the present invention, the delay mechanism is provided as a flat part formed in a valley-shaped slope plate. Accordingly, it is possible to realize the delay mechanism with a simple structure.

According to an embodiment of the present invention, the clutch lifter plate has an anchor rotation-stopped with respect to the transmission, and the delay mechanism is provided as an elliptic locking hole to lock the anchor. Accordingly, it is possible to realize the delay mechanism with a simple structure.

According to an embodiment of the present invention, the clutch lifter cam is provided with a cam surface, and the delay mechanism is provided as an idle cam of the cam surface. Accordingly, it is possible to realize the delay mechanism with a simple structure.

According to an embodiment of the present invention, the clutch lever is provided as a link mechanism connected with a plurality of arm members, and the delay mechanism is provided as a rotatable range for the respective arm members in the link mechanism. When the delay mechanism is provided on the clutch side, generally, it is necessary to provide a structure to realize a large sized delay in the clutch lifter cam or the like. On the other hand, as the clutch lever is formed with a link mechanism and the delay mechanism is provided as the rotatable range for the respective arm members in the link mechanism, it is possible to set the delay mechanism as a compact structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 14(a) and 14(b) are diagrams showing the master arm 83, a locking bar 87 and the like. FIG. 14(a) is a front view, and 14 FIG. 14(b), a line A-A cross-sectional view shown in FIG. 14(a);

FIG. 15(a) is a front view, and FIG. 15(b), a line A-A cross-sectional view shown in FIG. 15(a);

FIG. 16(a) is a front view, and FIG. 16(b), a line A-A cross-sectional view shown in FIG. 16(a);

FIG. 18(a) is a front view, and FIG. 18(b), a line A-A cross-sectional view shown in FIG. 18(a);

FIGS. 19(a) and 19(b) are diagrams showing the clutch lever 72 and the like. FIG. 19(a) is a front view, and FIG. 19(b), a line A-A cross-sectional view shown in FIG. 19(a);

FIGS. 20(a) and 20(b) are diagrams showing the clutch lever 72 and the like. FIG. 20(a) is a rear view, and FIG. 20(b), a diagram showing a transparently illustrated second doweled hole 72b in FIG. 19(a);

FIG. 21(a) is a diagram showing the positional relation on the side of the master arm 83 rather than the accumulation spring 57, and FIG. 21(b), a diagram showing the positional relation on the side of the clutch lever 72 rather than the accumulation spring 57;

FIGS. 22(a) and 22(b) are diagrams showing a status where the shift operation has progressed from FIGS. 21(a) and 21(b);

FIGS. 28(a) to 28(c) are right side views showing structures and operations of principle parts of a delay mechanism according to a first modification;

FIGS. 29(a) and 29(b) are diagrams showing principal parts of the delay mechanism according to a second modification. FIG. 29(a) is a right side view, and FIG. 29(b), a line A-A cross-sectional view shown in FIG. 29 (a);

FIGS. 30(a) to 30(c) are right side views showing the structures and operations of the principal parts of the delay mechanism according to a third modification;

FIGS. 32(a) to 32(c) are right side views showing the structures and operations of the principal parts of the delay mechanism according to a fourth modification;

DETAILED DESCRIPTION OF THE PREFERRED EMBODIMENTS

Hereinbelow, a motorcycle 1 having a clutch-interlock transmission 50 according to an embodiment of the present invention will be described based on FIGS. 1 to 20.

Note that in the following description, the description of front/rear, left/right and upward/downward directions follows a direction viewed from a rider who rides on the motorcycle unless explicitly stated. Further, in the figures, an arrow FR indicates the frontward direction with respect to the vehicle; an arrow LH, the leftward direction with respect to the vehicle; and an arrow UP, the upward direction with respect to the vehicle.

Figure 1:
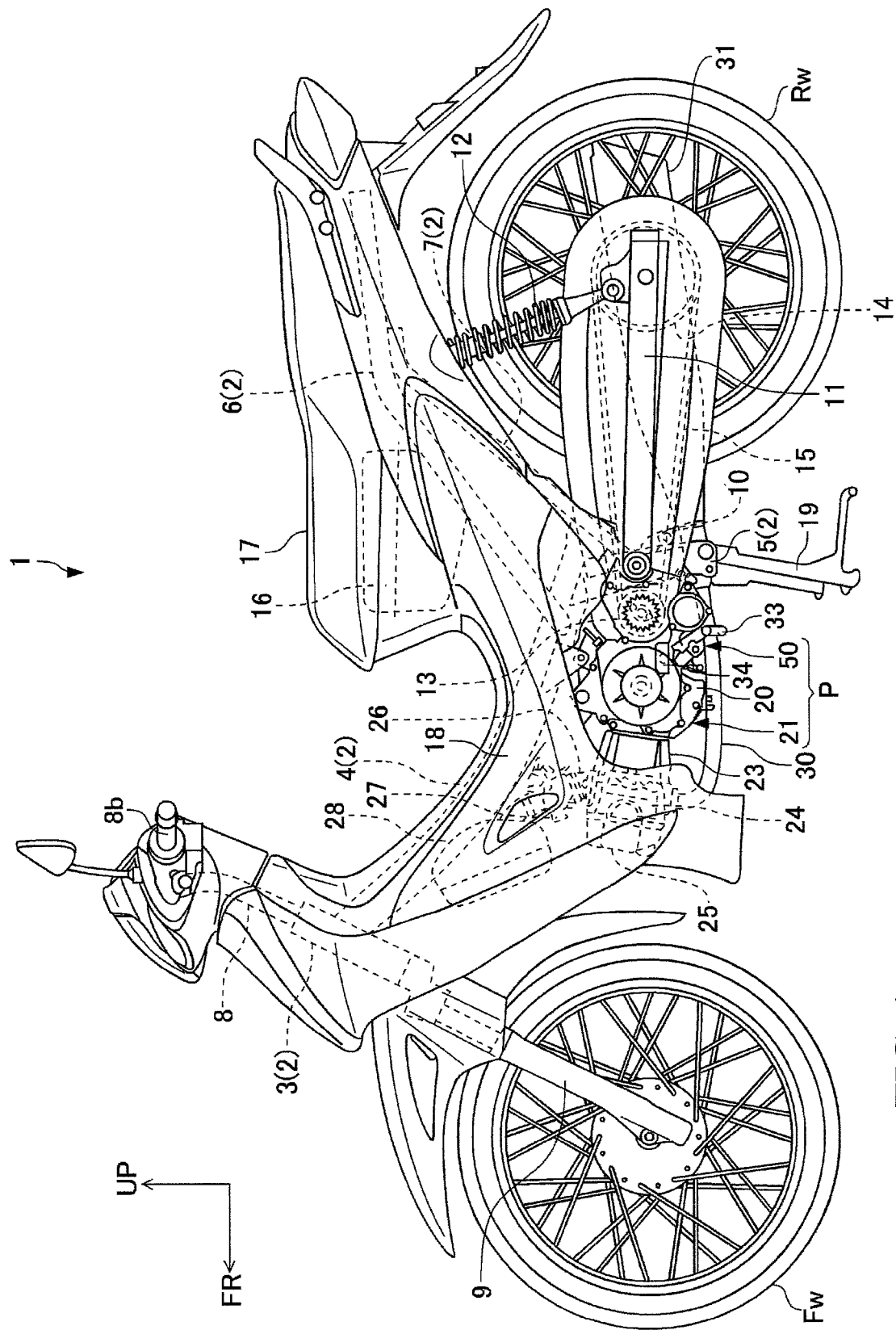
FIG. 1 is a side view of a motorcycle 1 having a transmission 50 according to a present embodiment.

As shown in FIG. 1, a vehicle body frame 2 of the motorcycle 1 has a head pipe 3, a main pipe 4, a center frame 5, a pair of left and right rear pipes 6, 6, and a pair of left and right back stays 7, 7. The head pipe 3 is positioned on the vehicle body front side (FR side). The main pipe 4 extends diagonally rearwardly and downwardly from the head pipe 3. The center frame 5 extends downwardly from a rear part of the main pipe 4 while expanding to the left and the right. The pair of left and right rear pipes 6, 6 extend diagonally rearwardly and upwardly from a position in front of the center frame 5 in the main pipe 4, and bend approximately horizontally in the middle, and extends to the rear. The pair of left and right back stays 7, 7 are provided between left and right sides of the center frame 5 expanding to the left and the right and rear parts of the rear pipes 6, 6.

A steering shaft 8 is rotatably pivoted with the head pipe 3. A front fork 9 having a suspension extends on the lower side of the steering shaft 8. A front wheel Fw is journaled to a lower end of the front fork 9. A handle bar 8b extending to the left and the right is attached to an upper part of the steering shaft 8.

A rear fork 11 is journaled to the center frame 5 via a pivot shaft 10 at its front end. The rear fork 11 extends rearwardly. A rear wheel Rw is journaled to a rear end of the rear fork 11 to oscillate upwardly/downwardly. A shock absorber 12 is provided between the rear part of the rear fork 11 and the rear pipe 6.

The power unit P, supported with the main pipe 4 and the center frame 5, is suspended in a lower part of the main pipe 4. The power unit P has a unit case 20, an internal combustion engine 21 integrally provided with the unit case 20, and the transmission 50.

An output sprocket 13 is fitted to an output shaft (as described later, a counter shaft 52 of the transmission (50)) of the power unit P. The output sprocket 13 is positioned right in front of the pivot shaft 10. A chain 15 is put between the output sprocket 13 and a driven sprocket 14 on the rear wheel Rw side.

A fuel tank 16 is installed on slopes of the rear pipes 6, 6. A seat 17 covers the fuel tank 16 and rear-side horizontal parts of the rear pipes 6, 6. A vehicle body cover 18 covers approximately the entire vehicle body frame 2. A rear anchor of a main stand 19 is journaled to a lower end of the center frame 5.

The power unit P is mainly formed by providing the internal combustion engine 21 on the front side of the unit case 20 and the transmission 50 on the rear side. The internal combustion engine 21 is an air-cooled single-cylinder 4-stroke internal combustion engine. The transmission 50 is a shift gear engagement mechanism with a 4-stage speed change.

Figure 2:
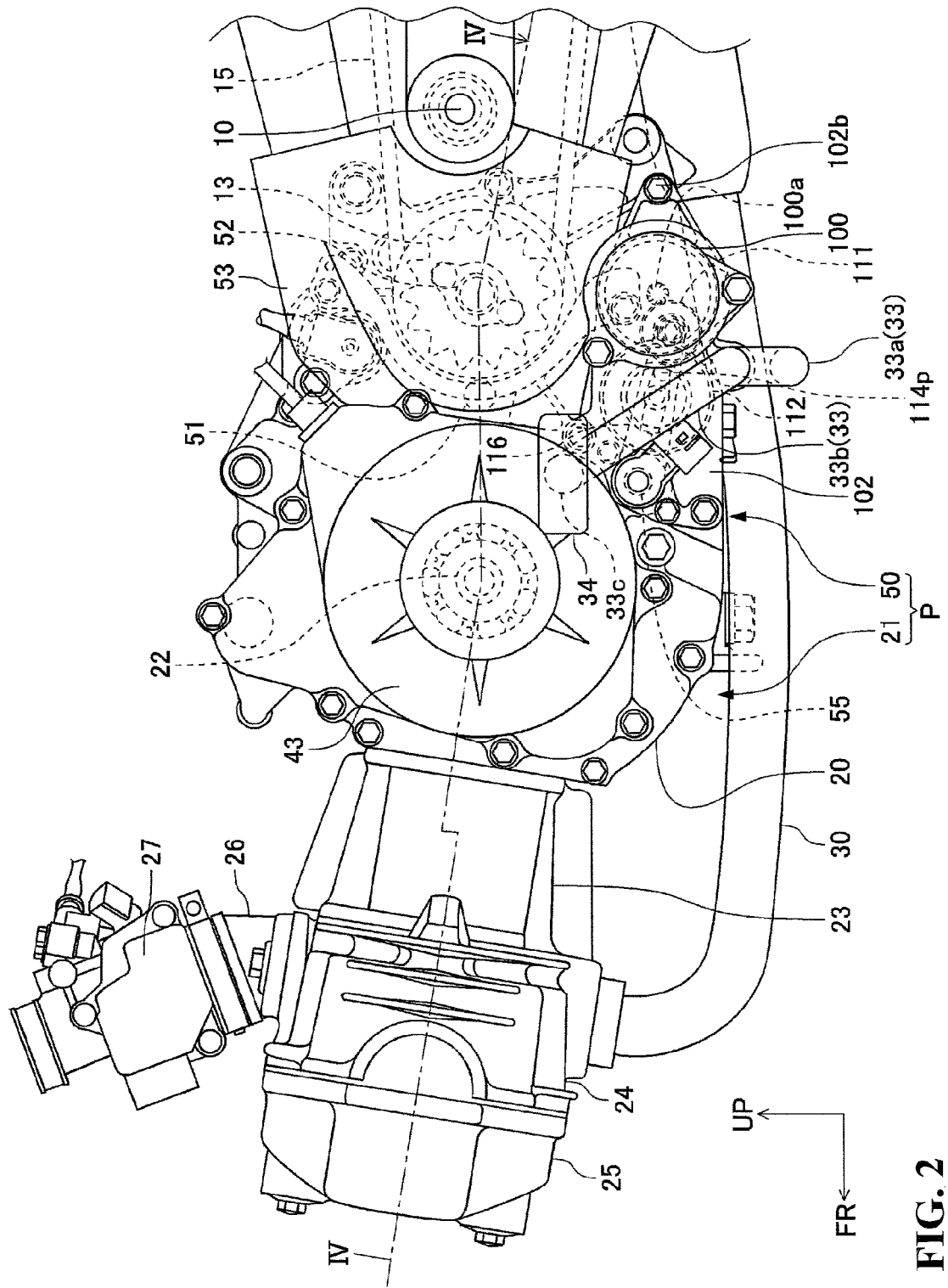
FIG. 2 is a left side view of a power unit P.
Figure 3:
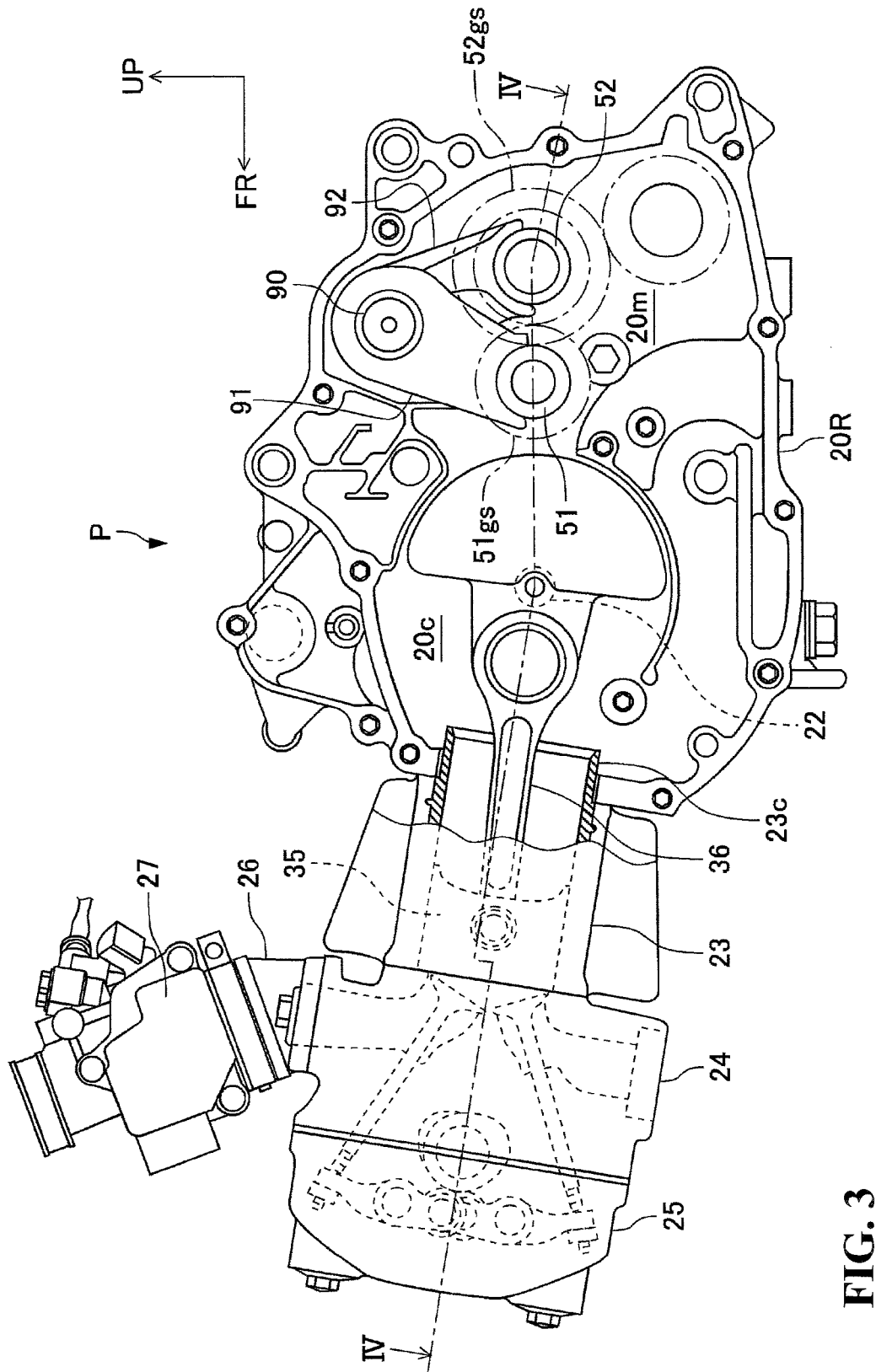
FIG. 3 is a left side view of the power unit P from which a left unit case and the like are omitted.

As shown in FIGS. 2 and 3, the internal combustion engine 21 has a unit case 20 that functions as a crankcase. A crankshaft 22 is oriented in a vehicle width direction (in a left and right direction), and rotatably journaled to the unit case 20. A cylinder block 23 and a cylinder head 24 are integrally fastened to a front part of the unit case 20. The cylinder block 23 and the cylinder head 24 project while they are forward-tilted approximately horizontally. A cylinder head cover 25 is put on the cylinder head 24.

An intake pipe 26 extends upward from an upper surface of the approximately-horizontally projected cylinder head 24. The intake pipe 26 is connected to an air cleaner 28. The air cleaner 28 is suspended from a front part of the main pipe 4 via a throttle body 27.

An exhaust pipe 30 extends downwardly from a lower surface of the cylinder head 24. The downward-extending exhaust pipe 30 immediately bends horizontally, then extends rearwardly to the diagonally right side, passes through a lower surface of a part of the unit case 20, rightwardly of the vehicle body, then directly extends rearwardly, and is connected to a right side muffler 31 on the right side of the rear wheel Rw.

A step bar 33 is fixed to the lower surface of the unit case 20. In the step bar 33, both sides of a center horizontal part 33a oriented in the vehicle width direction bend upwardly to form left and right arms 33b, 33b. Further, the step bar 33 bends outwardly in the vehicle width direction, to form left and right horizontal steps 33c, 33c. The center horizontal part 33a is fixed to the lower surface of the unit case 20.

The left and right arms 33b, 33b of the step bar 33 extend diagonally to the front and upwardly from the center horizontal part 33a along left and right side surfaces of the power unit P. Step members 34, 34 are attached to the left and right horizontal steps 33c, 33c bending outwardly at upper ends of the left and right arms 33b, 33b. The step member 34 has a long rectangular parallelepiped shape in the longitudinal direction. Note that the right side of the center horizontal part 33a bends across the exhaust pipe 30 extending in the longitudinal direction from a position under the exhaust pipe 30.

Figure 4:
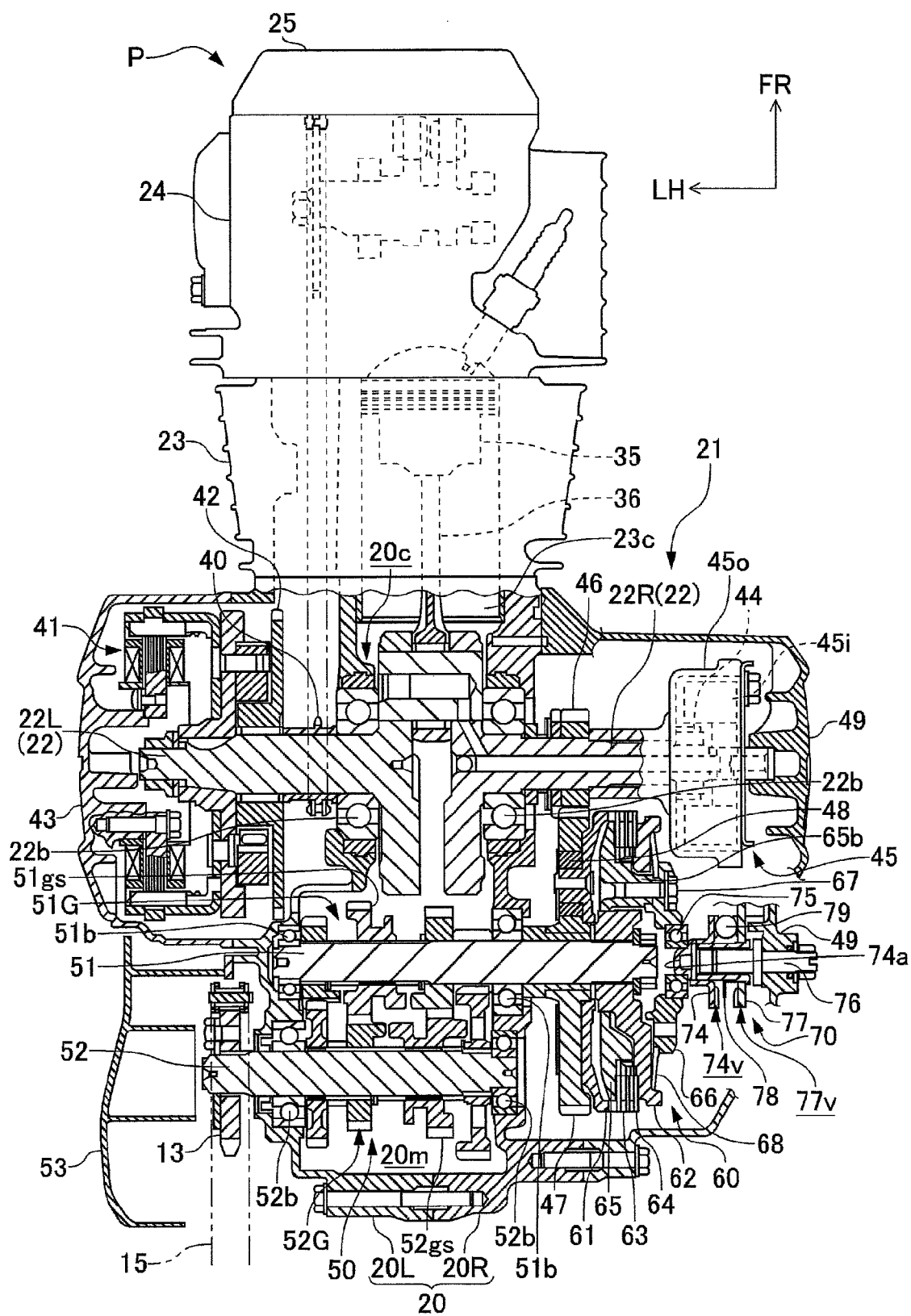
FIG. 4 is a partial cross-sectional view (line IV-IV cross-sectional view in FIG. 2) showing the inside of a unit case 20 of the power unit P.

As shown in FIG. 4, the unit case 20 is divided in a left unit case 20L and a right unit case 20R. By integrating the left unit case 20L and the right unit case 20R, inner space is formed. The inner space has a crankcase 20c on the front side and a transmission case 20m on the rear side. In the crankcase 20c, the crankshaft 22 is rotatably provided with the left and right unit cases 20L, 20R via the main bearings 22b, 22b. A transmission mechanism such as the transmission 50 is accommodated in the transmission case 20m.

In a cylinder liner 23c integrally molded in the cylinder block 23, a piston 35 slides reciprocally. The piston 35 and the crankshaft 22, connected with a connecting rod 36, form a crank mechanism.

A drive sprocket 40 of a valve drive system is fitted to a left-side crankshaft 22L protruding from the left unit case 20L to the left side in the vicinity of a main bearing 22b. An AC generator 41 is provided at the left end of the left-side crankshaft 22L. A driven gear 42 of a start mechanism is fitted between the drive sprocket 40 and the AC generator 41.

The AC generator 41 projecting on the left side of the left unit case 20L is covered with the ACG cover 43 as a left-side unit case cover, from the left side.

On the other hand, a centrifugal takeoff clutch 45 is provided on a right-side crankshaft 22R protruding from the right unit case 20R to the right side. In the takeoff clutch 45, a clutch outer 45o is supported rotatably around a clutch inner 45i integrally fixed with the right-side crankshaft 22R. When the number of revolutions (number of engine revolutions) of the crankshaft 22 exceeds a predetermined number of revolutions, a clutch shoe of the clutch inner 45i is pressed against the clutch outer 45o, which transmits the power.

Note that a one-way clutch 44 is provided between the clutch outer 45o and the clutch inner 45i. With this arrangement, an engine brake is directly effective without the takeoff clutch 45.

In the right-side crankshaft 22R, a primary drive gear 46, which is in contact with the left side of the clutch outer 45o and rotates along with the clutch outer 45o, is rotatably journaled to the right-side crankshaft 22R.

As shown in FIG. 4, in the transmission case 20m as inner space on the rear side of the unit case 20, a main shaft 51 extends in parallel with the crankshaft 22 in a rear position of the crankshaft 22, and rotatably installed on the left and right unit cases 20L, 20R via bearings 51b, 51b. In a further rear position from the main shaft 51, the counter shaft 52 extends in parallel with the main shaft 51, and rotatably installed on the left and right unit cases 20L and 20R via bearings 52b, 52b. The crankshaft 22, the main shaft 51 and the counter shaft 52, in this order, are provided in linearly arrayed state from the front.

The transmission 50 is formed with always mutually engaged first to fourth shift position gears of a gear array 51G arranged on the main shaft 51 and a gear array 52G arranged on the counter shaft 52. One of the gear array 51G and the gear array 52G rotates along with the shaft, and the other freely rotates with respect to the shaft.

A gearshift position at any of the first to fourth shift position or a neutral state is established by combination of movement of a serration-engaged shifter gear 51gs of the gear array 51G on the main shaft 51 in the axial direction to be disconnected from adjacent gear and movement of a serration-engaged shifter gear 52gs of the gear array 52G on the counter shaft 52 in the axial direction to be disconnected from an adjacent gear.

The main shaft 51 protrudes from the right unit case 20R to the right side. A clutch 60 is provided on the projecting part of the main shaft 51. A clutch outer 61 of the clutch 60 is relatively rotatably journaled to the main shaft 51 via a sleeve 59. A primary driven gear 47 is attached to the clutch outer 61 via a buffer member 48. A primary drive gear 46 decelerates the primary driven gear 47 engaged with the drive gear and rotates along with the clutch outer 61.

A clutch inner 62 is integrally fitted to a right end of the main shaft 51. A plurality of drive friction plates 63 serration-engaged with an outer periphery of a peripheral wall of the clutch inner 62 and driven friction plates 64 serration-engaged with an inner periphery of the peripheral wall of the clutch outer 61 are alternately arrayed in the axial direction. The pressure plate 65, holding the drive friction plates 63 and the driven friction plates 64 between the pressure plate 65 and a disc outer periphery of the clutch inner 62, is slidably supported with the clutch inner 62 in the axial direction.

Figure 7:
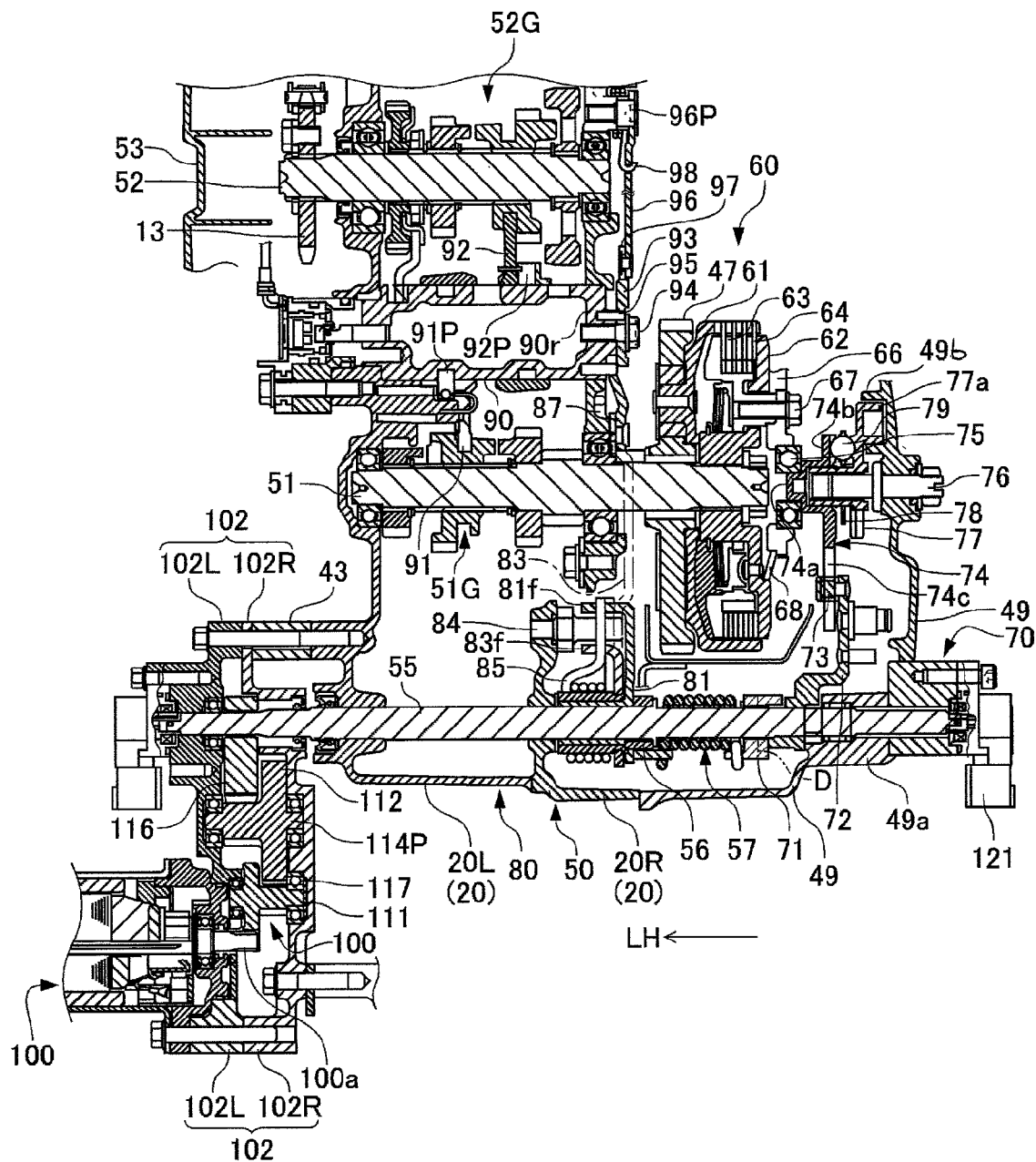
FIG. 7 is a cross-sectional view (line cross-sectional view in FIGS. 5 and 6) of a transmission mechanism of the power unit P.

As shown in FIGS. 4 and 7, the pressure plate 65 that is slidable in the axial direction is positioned on the inner side from the clutch inner 62 in the axial direction inside the clutch outer 61. In the disc member of the clutch inner 62, a plurality of support bosses 65b projecting from the pressure plate 65 are inserted through the plurality of through holes formed in a circumferential direction. At a leading end of the support boss 65b, a ring-shaped release flange 66 is fastened with a bolt 67.

A clutch spring 68 which is a disc spring is provided between the release flange 66 and the clutch inner 62. With the clutch spring 68, the pressure plate 65 is pressed to the right integrally with the release flange 66. The pressure plate 65 holds the drive friction plates 63 and the driven friction plates 64 between the pressure plate 65 and the clutch inner 62. With this arrangement, the clutch 60 is maintained in a connected status, and the rotation of the clutch outer 61 is transmitted to the clutch inner 62 and further to the main shaft 51.

When the release flange 66 is pushed to the left, and the pressure plate 65 moves to the left against the clutch spring 68, the interval between the pressure plate 65 and the clutch inner 62 is increased. With this arrangement, the holding of the drive friction plates 63 and the driven friction plates 64 is loosened, and the connected status of the clutch 60 is released.

The clutch 60 is formed with a slipper clutch having a back torque limiter mechanism (also called a back torque reduction mechanism). The back torque limiter mechanism is a mechanism to, when excessive torque (back torque) acts on the clutch 60 in an opposite direction to a forward direction power transmission, return the clutch 60 from the connected status to a connection-loosened status (clutch half engaged status). As the back torque limiter mechanism, a mechanism having a well-known structure can be used. According to the back torque limiter mechanism, it is possible to reduce shock due to back torque upon shift down.

The rotation of the crankshaft 22 of the internal combustion engine 21 is transmitted through the takeoff clutch 45 and the clutch 60 to the main shaft 51 of the transmission 50.

The takeoff clutch 45 provided at the right end of the right-side crankshaft 22R and the clutch 60 provided at the right end of the main shaft 51 are covered with a right-side unit case cover 49 from the right side.

Note that the output sprocket 13 fitted to the end of the counter shaft 52, inserted through the left unit case 20L leftward, is covered with a sprocket cover 53, except a rear part where the chain 15 extends, from the left side.

Figure 5:
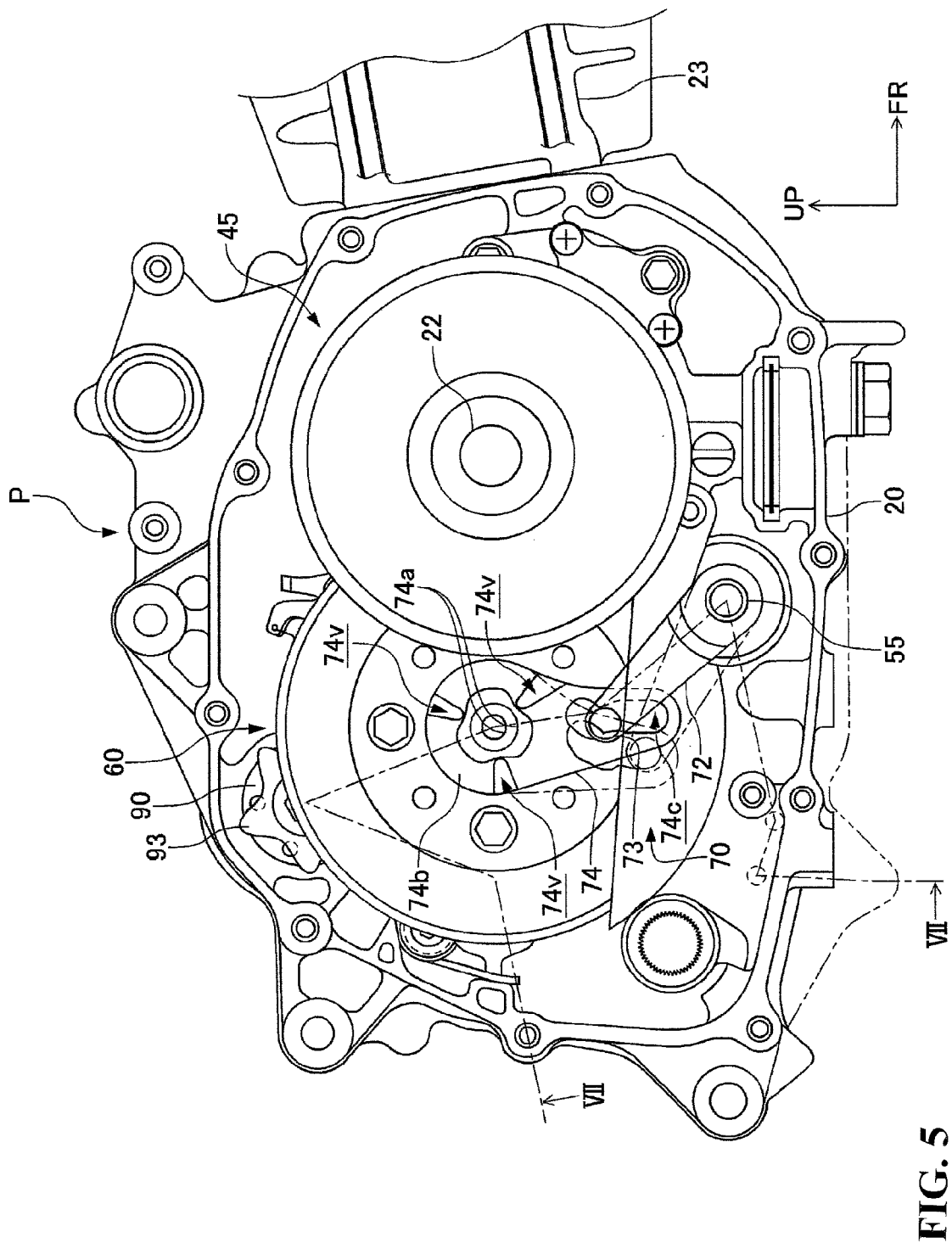
FIG. 5 is a right side view of the power unit P in which a right side unit case cover is removed.
Figure 6:
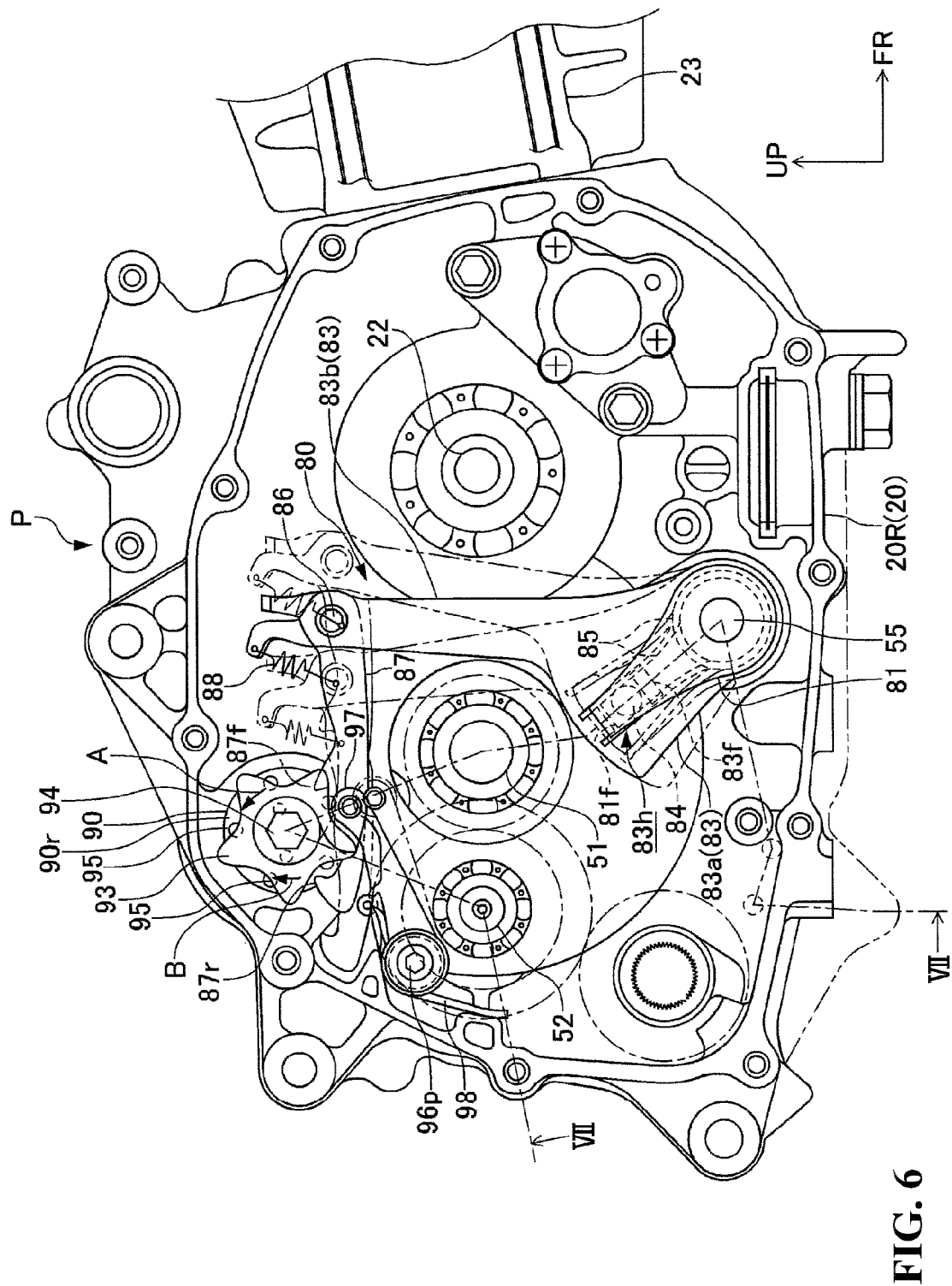
FIG. 6 is a right side view of the power unit P in which a takeoff clutch, a clutch and the like are further omitted from the status shown in FIG. 5.

As shown in FIGS. 2, 5 and 6, the shift spindle 55 is provided diagonally low and to the rear of the crankshaft 22 and diagonally low and to the front of the counter shaft 52 and the main shaft 51. As shown in FIG. 7, the shift spindle 55 is inserted through the left and right unit cases 20L and 20R in the left and right directions. Further, the right side part is inserted through a bearing boss 49a of the right-side unit case cover 49 and rotatably journaled.

The shift spindle 55 is provided in a lower part of the unit case 20, and positioned below a step member 34 in a side view shown in FIG. 2.

The rotation of the shift spindle 55 drives a clutch operation mechanism 70 and a shift operation mechanism 80. The clutch operation mechanism 70 operates the clutch 60 to perform disconnection and connection of the clutch 60. The shift operation mechanism 80 operates the transmission 50 to shift the shift position of the transmission 50.

The clutch operation mechanism 70 will be described based on FIGS. 4 and 7.

As shown in FIGS. 4 and 7, in the shift spindle 55, the clutch lever 72 is oscillatably supported in the vicinity of the bearing boss 49a of the right-side unit case cover 49. The structure and operation of the oscillation of the clutch lever 72 in accordance with the rotation of the shift spindle 55 will be described in detail later.

Figure 8:
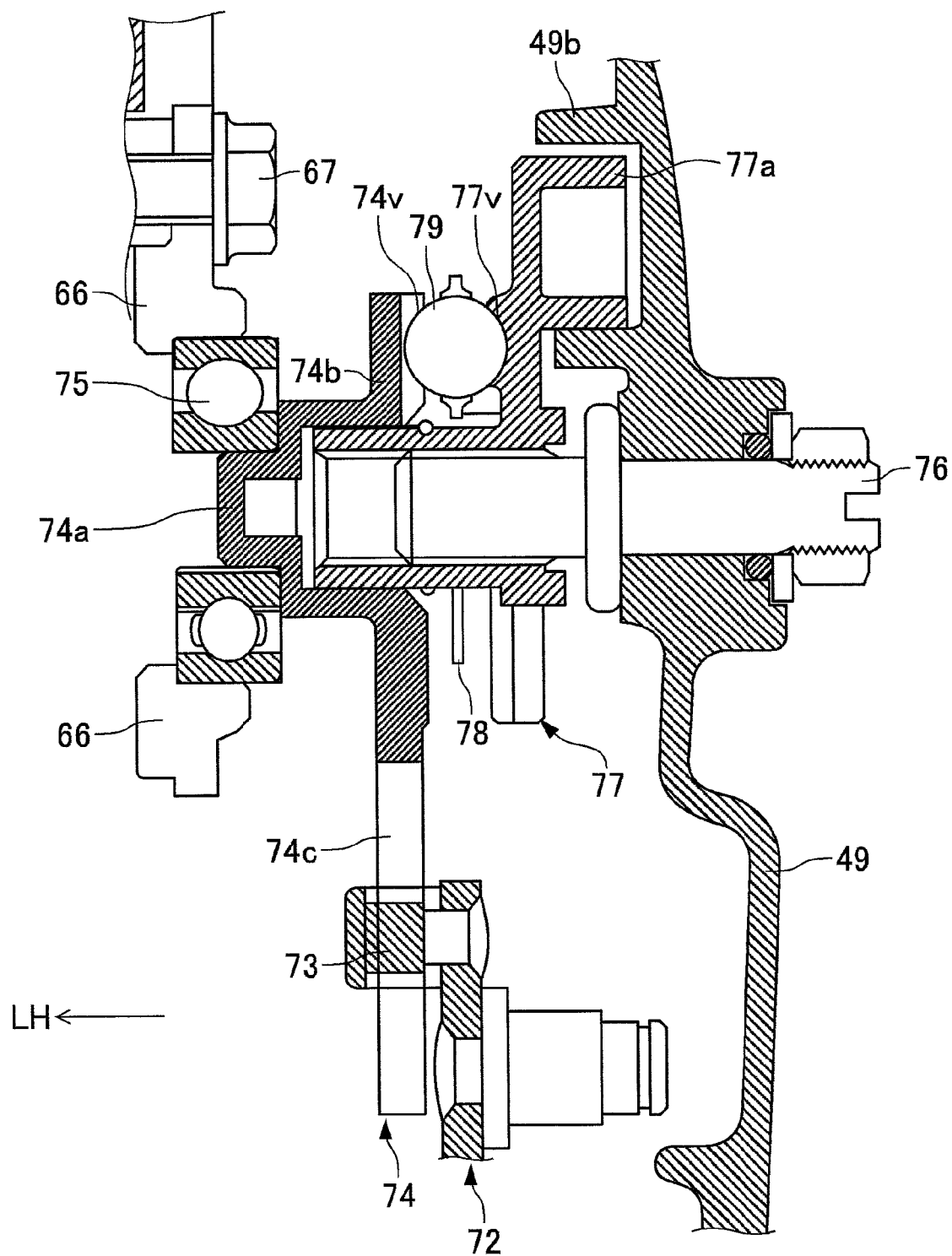
FIG. 8 is a partially-enlarged view of the periphery of a clutch lifter plate 77 in FIG. 7.

On the other hand, as shown in FIGS. 4, 7 and 8, an outer ring of the ball bearing 75 is fitted to an inner peripheral surface of the ring-shaped release flange 66 of the clutch 60. A rear anchor intrusion member 74a at the rotational center of the operation lever 74, or clutch lifter cam 74, is fit-inserted and fixed to an inner ring of the ball bearing 75. The clutch lifter cam 74 is a cam to lift the clutch 60 for disconnection or connection. The rear anchor intrusion member 74a intrudes in two steps of leading end small diameter part and large diameter part. The leading end small diameter part is fitted in the inner ring of the ball bearing 75. A roller 73 projected from the leading end of the clutch lever 72 is engaged with a rotating engagement cam hole 74c of the operation lever or clutch lifter 74.

The clutch adjustment bolt 76 is fixed to an extended part of the main shaft 51 of the right-side unit case cover 49. The clutch adjustment bolt 76 is inserted in the large diameter part of the rear anchor intrusion member 74a of the operation lever 74 from the right side, and supports the operation lever 74 rotatably and slidably in the axial direction. In a rear anchor disc member 74b around the rear anchor intrusion member 74a of the operation lever 74, the clutch lifter plate 77, which is facing on the right side, and which is rotation-regulated with the right-side unit case cover 49, is supported with the clutch adjustment bolt 76. The operation lever 74 is relatively rotatable with respect to the rotation-regulated clutch lifter plate 77, and is movable in the axial direction. The operation lever 74 is pressed to the right by operation of the spring force of the clutch spring 68 of the clutch 60 via the ball bearing 75.

In other words, the clutch adjustment bolt 76 is a part of the right-side unit case cover 49 and is fixed to an extended part of the main shaft 51. The clutch adjustment bolt 76 is inserted in the large diameter part of the rear anchor intrusion member 74a of the clutch lifter cam 74 from the right side, and supports the clutch lifter cam 74 rotatably and slidably in the axial direction. In a rear anchor disc member 74b around the rear anchor intrusion member 74a of the clutch lifter cam 74, the clutch lifter plate 77, opposite on the right side, and rotation-regulated with the right-side unit case cover 49, is supported with the clutch adjustment bolt 76. As shown in FIGS. 7 and 8, the clutch lifter plate 77 has an anchor 77a rotation-stopped (rotation-regulated) with respect to the transmission (more particularly, the locking hole 49b of the right-side unit case cover 49). The locking hole 49b is provided inside the right-side unit case cover 49. The clutch lifter cam 74 is relatively rotatable to the clutch lifter plate 77 rotation-regulated with the anchor 77a, and movable in the axial direction. The clutch lifter cam 74 is pressed to the right by operation of the spring force of the clutch spring 68 of the clutch 60 via the ball bearing 75.

It is possible to increase/decrease the interval between opposed surfaces of the clutch lifter plate 77 and the rear anchor disc member 74b of the operation lever 74 by changing a relative position (engagement position) between a female screw formed in the rotational shaft part of the clutch lifter plate 77 and a male screw of the clutch adjustment bolt 76b. With this arrangement, it is possible to increase/decrease the backlash in the moving direction in a clutch lifter mechanism 74 to 79.

Groove lines 74v, 77v are formed in three positions in a radial pattern in the circumferential direction in mutually opposed surfaces of the rear anchor disc member 74b of the operation lever 74 and the clutch lifter plate 77. Three release balls 79 held rollably with a retainer 78 exist between the rear anchor disc member 74b and the clutch lifter plate 77 pressed with the clutch spring 68 between the rear anchor disc member 74b and the clutch lifter plate 77.

When the clutch 60 is in the connected status, the three groove lines 74v, 77v in the opposed surfaces of the rear anchor disc member 74b and the clutch lifter plate 77 are opposite to each other. The three release balls 79 respectively fall in the mutually opposed groove lines 74v, 77v.

Then, when the shift spindle 55 rotates upon transmission, the clutch lever 72 oscillates, and the operation lever 74 rotates via engagement between the roller 73 and the engagement cam hole 74c. With this arrangement, the groove line 74v of the rear anchor disc member 74b of the operation lever 74 rotates relatively to the groove line 77v of the clutch lifter plate 77.

Thereafter, the release balls 79 held between the rear anchor disc member 74b of the operation lever 74 and the clutch lifter plate 77 roll, while smoothly rising on the slopes of the groove lines 74v, 77v, to press and move the operation lever 74 to the clutch 60 side (left side). Accordingly, the release flange 66 moves to the left against the pressing force of the clutch spring 68 via the ball bearing 75, and the pressure plate 65 moves to the left. With this arrangement, in the clutch 60, the connected status is released and disconnected.

As described above, the clutch lifter mechanisms 74 to 79 to perform disconnection of the clutch 60 by moving with respect to the clutch 60 is formed with the operation lever 74, the ball bearing 75, the clutch adjustment bolt 76, the clutch lifter plate 77, the retainer 78, the release balls 79 and the like.

As shown in FIG. 7, the clutch operation mechanism 70 is formed on the outer side (right side) of the clutch 60 and on the inner side (left side) of the right-side unit case cover 49. On the other hand, the shift operation mechanism 80 to operate the transmission 50 to shift the shift position is formed on the inner side (left side) of the clutch 60.

The shift forks 91, 92 move the shifter gear 51gs on the main shaft 51 and the shifter gear 52gs on the counter shaft 52 of the transmission 50 in the axial direction. As shown in FIG. 3, the shift forks 91, 92, in an upper position between the main shaft 51 and the counter shaft 52, operate by rotation of a shift drum 90 rotatably provided between the left and right unit cases 20L, 20R.

As shown in FIG. 7, the shift forks 91, 92 are rotatably journaled relatively to the shift drum 90 at the rear anchor. In the shift forks 91, 92, engagement pins 91p, 92p projecting towards the rear anchor are slidably engaged with a predetermined-shaped shift grooves formed in an outer peripheral surface of the shift drum 90. The respective leading ends of the shift forks 91, 92 are respectively engaged with the shifter gears 51gs, 52gs. Accordingly, when the shift drum 90 rotates, the shift forks 91, 92 move in the axial direction via the engagement pins 91p, 92p guided with the shift groove and moved in the axial direction, to shift the shift position of the transmission 50.

As shown in FIGS. 6 and 7, the right end of the shift drum 90 is slidably supported with the right unit case 20R on the outer peripheral surface. A right-side wall 90r of the shift drum 90 is exposed to the right side from a bearing opening of the right unit case 20R. A pentalpha-shaped star plate 93 is fixed to a central boss of the right-side wall 90r with a bolt 94. Five locking pins 95 are built around the bolt 94 of the right-side wall 90r. The locking pins 95 are provided between the right-side wall 90r and the star plate 93.

As shown in FIG. 6, the stopper arm 96 is journaled to the pivot 96p, and oscillated and pressed with the spring 98. The locking roller 97 is journaled to the leading end of the stopper arm 96. The locking roller 97 is pressed against the outer peripheral surface of the star plate 93 having five peaks in a radial pattern. The shift drum 90 is positioned in a predetermined position with the locking roller 97 fitted and stabled among the peaks of the star plate 93.

A mechanism to rotate by operating the shift drum 90 to the locking pins 95 is formed along the right side surface of the right unit case 20R. As shown in FIGS. 6, 7 and 9 to 11, the gear shift arm 81 is externally fitted in the sleeve 81d relative-rotatably (oscillatably) to the shift spindle 55. The master arm 83 is externally fitted to relative-rotatably (oscillatably) to the sleeve 81d of the gear shift arm 81.

The master arm 83 has a fan-shaped oscillation rear anchor 83a and an arm 83b extending from an upper position of the oscillation rear anchor 83a. A regulation opening 83h is formed in the oscillation rear anchor 83a overlapped with the gear shift arm 81 in a side view. A spring locking piece 83f is formed to bend to the left on a side on the oscillation center side of the regulation opening 83h. The gear shift arm 81 has a spring locking piece 81f formed to bend to the left. The spring locking piece 81f is inserted through the regulation opening 83h of the master arm 83.

The regulation pin 84 projects to the right from the right unit case 20R is inserted through the regulation opening 83h of the oscillation rear anchor 83a of the master arm 83. The leading end of the regulation pin 84 is in the vicinity of the gear shift arm 81. Then, the both ends of the shift return spring 85 coiled around the outer periphery of the sleeve 81d extend so as to hold the regulation pin 84. The spring locking piece 81f of the gear shift arm 81 and the spring locking piece 83f of the master arm 83 have a width the same as the diameter of the regulation pin 84, and held, along with the regulation pin 84, between the both ends of the shift return spring 85.

In the vicinity of an upper end of the arm 83b extending above the master arm 83, a locking bar 87, which is connected at a front end with the connecting pin 86, extends to the rear. The locking bar 87 extends to the rear beneath the five locking pins 95 built between the shift drum 90 and the star plate 93.

A tension spring 88 is put between the upper end of the arm 83b of the master arm 83 and the locking bar 87. The tension spring 88 oscillates the locking bar 87, which extends to the rear and upwardly and presses it, and brings the locking pins 95 positioned at a lower side to abut on the locking bar 87. At the upper-side edge of the locking bar 87, the locking claws 87f, 87r, longitudinally separated, projects upwardly.

As indicated with a solid line in FIG. 6, when power is not applied to the shift spindle 55, both ends of the shift return spring 85 hold the regulation pin 84 therebetween, and at the same time hold the spring locking piece 81f of the gear shift arm 81 and the spring locking piece 83f of the master arm 83. Further, the gear shift arm 81 and the master awl 83 are positioned such that the shift spindle 55, the spring locking piece 83f, the regulation pin 84 and the spring locking piece 81f are arrayed in line. At this time, the locking bar 87 brings two locking pins 95, 95 positioned on the lower side to abut on an upper-side edge between the front and rear locking claws 87f, 87r, by a pressing force of the tension spring 88.

When the power is applied to the shift spindle 55 and it rotates, the gear shift arm 81 oscillates against the shift return spring 85. When the spring locking piece 81f acts on the master arm 83, then in the master arm 83, an arm 83b extending upwardly oscillates in the front and rear directions. Then the locking bar 87 connected to the master arm 83 with the connecting pin 86 moves in the front and in the rear directions, and one of the locking claws 87f, 87r in front and rear of the locking bar 87 is locked with the locking pin 95, to rotate the shift drum 90 along with the star plate 93.

When the locking roller 97 at the leading end of the stopper arm 96 is over the top of one peak of the star plate 93 by the rotation of the star plate 93, the star plate 93 rotates at a predetermined angle along with the shift drum 90 with the pressing force of the locking roller 97 until the locking roller 97 is settled on the valley.

Accordingly, the movement of the locking bar 87 in the front and rear directions with the oscillation of the master arm 83 may be stopped when the locking claws 87f, 87r are locked with the locking pins 95 and the locking roller 97 is over the top of the peak of the star plate 93. Thereafter, the master arm 83, the gear shift arm 81, and the shift spindle 55 may be returned to the initial statuses.

The shift forks 91, 92, guided with the shift grooves and moved in the axial direction by the rotation of the shift drum 90 at the predetermined angle, move the shifter gears 51gs, 52gs of the transmission 50, to shift the shift position.

Note that as described later, as the connection of the clutch 60 is released before the shifting of the shift position in the transmission 50, the shift position is smoothly shifted.

The shift spindle 55 which drives both of the above-described shift operation mechanism 80 and the clutch operation mechanism 70 rotates by the drive of the shift motor 100 transmitted via the shift power transmission mechanism 110. The shift power transmission mechanism 110 will be described below.

As shown in FIG. 2, the shift spindle 55 is provided in a position in a diagonally lower and to the rear of the crankshaft 22 and diagonally lower and to the front of the counter shaft 52 and the main shaft 51, and is inserted through the left and right unit cases 20L, 20R outward in the left and right directions.

As shown in FIG. 7, the right side part of the shift spindle 55 inserted through the right unit case 20R is further inserted through the bearing boss 49a of the right-side unit case cover 49. The right end of the shift spindle 55 inserted through the bearing boss 49a of the right-side unit case cover 49 is provided with an angle sensor 121 to detect a rotational angle of the right end of the shift spindle 55.

The left side of the shift spindle 55 inserted through the left unit case 20L is provided with the shift power transmission mechanism 110. The shift power transmission mechanism 110 is accommodated in a shift power transmission case 102 having a longitudinally long and horizontally narrow flat shape.

The shift power transmission case 102 is formed by combining the left-side shift power transmission case 102L and the right-side shift power transmission case 102R. The shift spindle 55 is inserted in a front end of the shift power transmission case 102 and extends to the rear. Then, as shown in FIG. 2, the shift power transmission case 102 is provided below the ACG cover 43 as a unit case cover to cover the AG generator 41 on the side of the crankshaft 22 and the sprocket cover 53 to cover the output sprocket 13 on the side of the counter shaft 52.

In the shift power transmission mechanism 110, when the shift motor 100 is driven and a drive gear shaft 100a rotates, the rotation is decelerated via a deceleration gear 111 and transmitted to the rotation of a crank gear 112. The rotation of the crank gear 112 oscillates an oscillating arm 116 via a crank pin 114p, to rotate the shift spindle 55 integral with the oscillating arm 116. Then, when the shift spindle 55 rotates, the clutch operation mechanism 70 operates the clutch 60 to perform clutch disconnection/connection, and the transmission operation mechanism 80 operates the transmission 50 to shift the shift position.

Next, the structure of a delay mechanism and a lost mechanism of the transmission 50 will be described with reference to FIGS. 9 to 20.

As shown in FIGS. 9 to 12, the transmission 50 mainly has, as a structure regarding the delay mechanism and the lost mechanism, a single shift spindle 55, the master arm 83, the gear shift arm 81, the shift return spring 85, the preload stopper collar 56, the accumulation spring 57, the accumulation collar 71 and the clutch lever 72.

In the transmission 50, the accumulation spring 57 functions as an accumulation mechanism capable of accumulating a rotational force transmitted from the shift spindle 55 to the master arm 83. A delay mechanism to delay a disconnection operation of the clutch 60 with the clutch lever 72 until the accumulation of the rotational force with the accumulation spring 57 is completed is provided between the shift spindle 55 and the clutch 60. This delay mechanism functions as a lost mechanism not to contribute a part of the rotational angle of the shift spindle 55 to the disconnection operation of the clutch 60 with the clutch lever 72.

Figure 13:
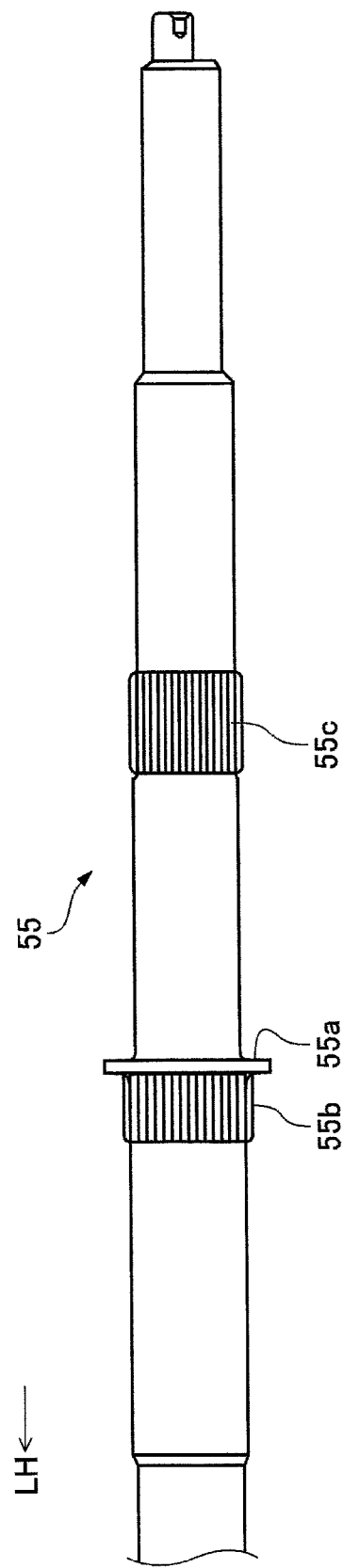
FIG. 13 is a diagram showing a part of the shift spindle 55.
Figure 14A:
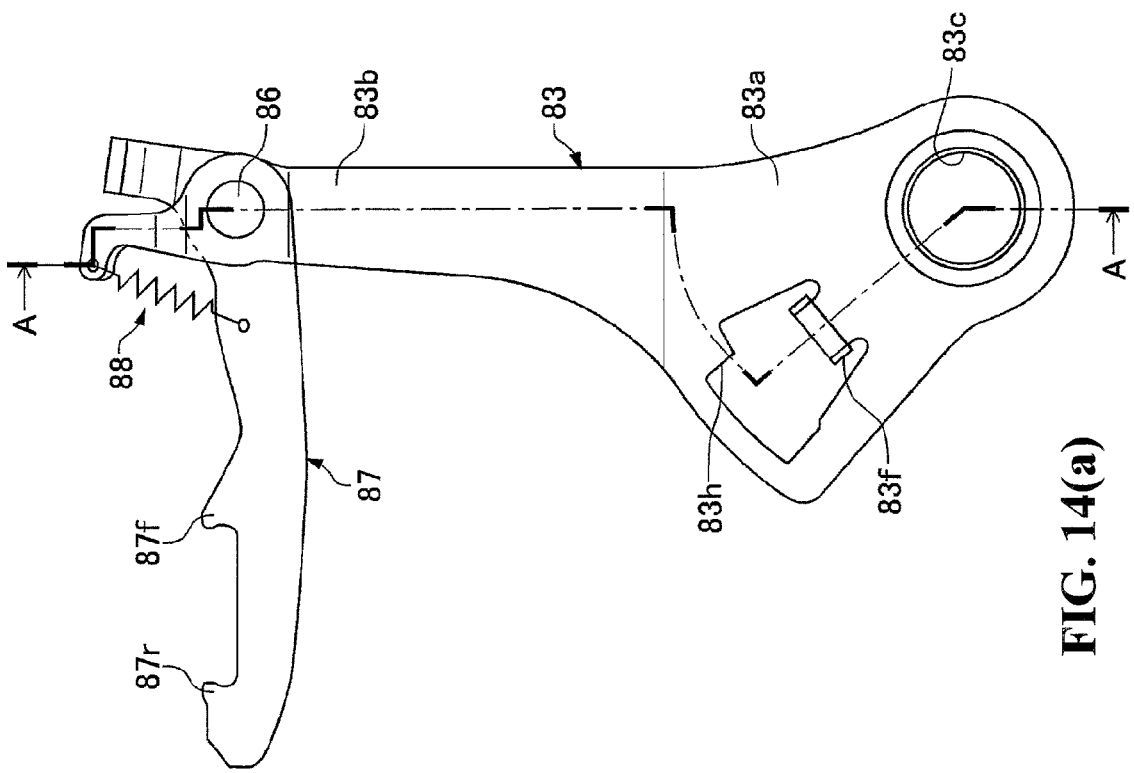
Figure 14B:
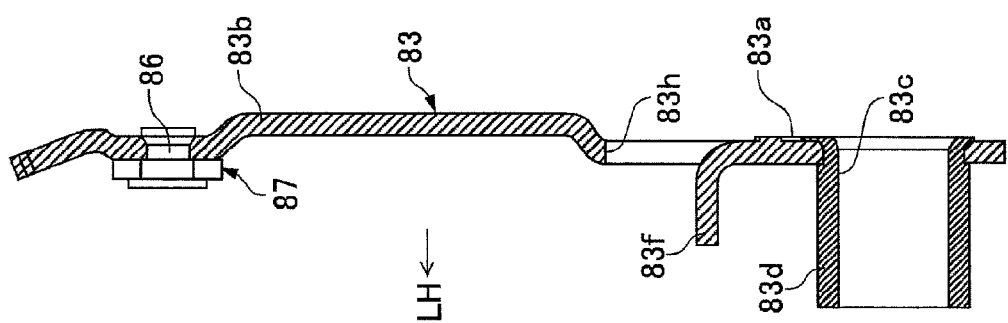
Figure 15A:
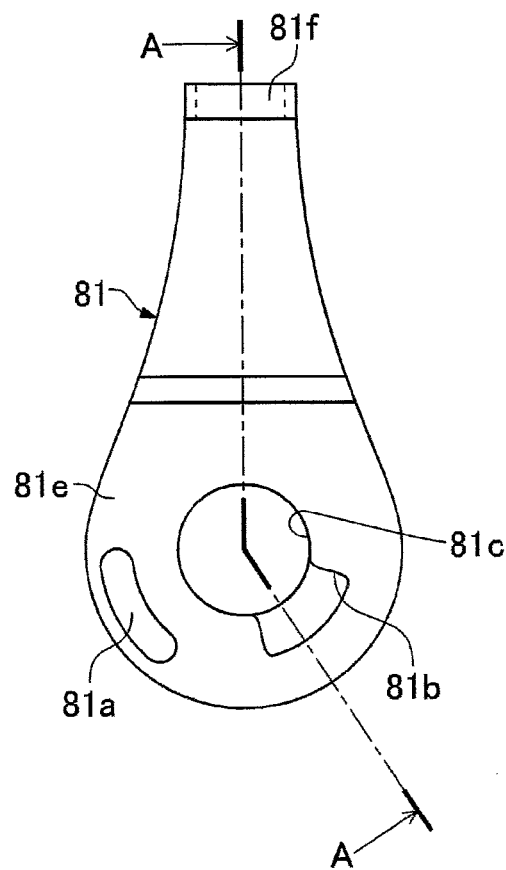
FIGS. 15(a) and 15(b) are diagrams showing the gear shift arm 81.
Figure 15B:
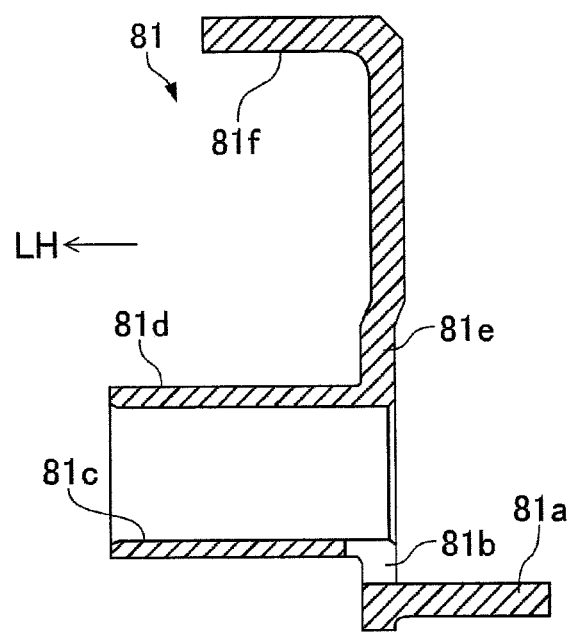
Figure 16A:
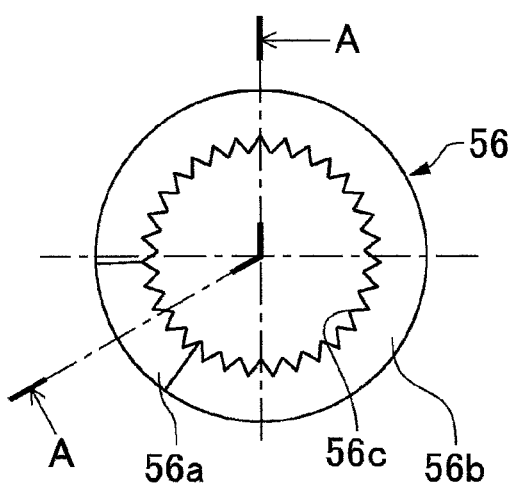
FIGS. 16(a) and 16(b) are diagrams showing the preload stopper collar 56.
Figure 16B:
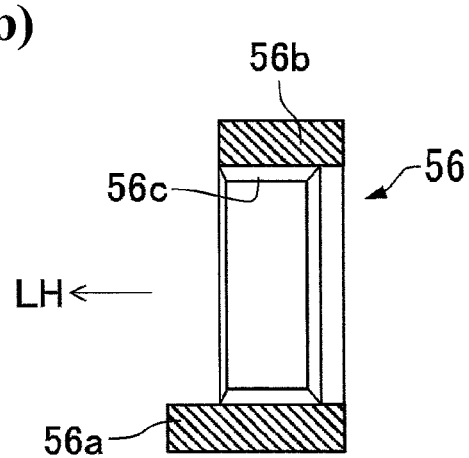

As shown in FIG. 13, the shift spindle 55 has a thrust member 55a provided at a central part in the axial direction, a serration member 55b adjacent to the thrust member 55a in the axial direction and provided on the left side, and a serration member 55c provided on the opposite side (right side) to the serration member 55b away from the thrust member 55a with an interval, holding the thrust member 55a therebetween.

As shown in FIGS. 9 to 12 and 14(b), the master arm 83 is oscillatably supported with the shift spindle 55. The master arm 83 transmits the rotational force of the shift spindle 55 to the shift drum 90 to operate the shift drum 90 by rotating it as described above. The master arm 83 has the oscillation rear anchor 83a, the arm 83b, the regulation opening 83h, the spring locking piece 83f, a sleeve 83d, and an insertion hole 83c.

The oscillation rear anchor 83a has a fan shape which spreads toward the leading end. The arm 83b extends from an upper part of the oscillation rear anchor 83a. The regulation opening 83h is formed in a position overlapped with the gear shift arm 81 in a side view in the regulation opening 83h. The spring locking piece 83f is formed to bend (protrude) to the left on the side of the regulation opening 83h on the oscillation center side. The sleeve 83d is provided so as to extend to the oscillation center of the master arm 83 along the axial direction and to protrude in the projecting direction of the spring locking piece 83f. The insertion hole 83c is provided so as to be inserted through the inside of the sleeve 83d along the axial direction of the master arm 83. In the insertion hole 83c, the sleeve 81d (to be described later) of the gear shift arm 81 is inserted therethrough.

The locking bar 87 is as described above.

As shown in FIGS. 9 to 12 and 15(a) and 15(b), the gear shift arm 81 abuts on the master arm 83, and is rotatably supported with the shift spindle 55. The gear shift arm 81 has an oscillating rear anchor 81e, the spring locking piece 81f, a gear shift arm-side locking member 81a, a first doweled hole 81b, an insertion hole 81c and the sleeve 81d.

The oscillating rear anchor 81e has a shape which shrinks toward the leading end side. The oscillating rear anchor 81e is provided adjacent to the oscillation rear anchor 83a of the master arm 83 on the right side. The spring locking piece 81f is formed by bending (extending) the leading end side of the gear shift arm 81 to the left. The spring locking piece 81f is inserted through the regulation opening 83h of the master arm 83 from the right side to the left side.

The sleeve 81d is provided so as to extend to the oscillation center of the gear shift arm 81 along the axial direction and protrudes in the projection direction of the spring locking piece 81f. The insertion hole 81c is provided so as to be inserted through the inside of the sleeve 81d along the axial direction of the gear shift arm 81. The shift spindle 55 is inserted through the insertion hole 81c.

The gear shift arm-side locking member 81a protrudes to the right side to a peripheral part in the oscillating rear anchor 81e away from the insertion hole 81c in the radial direction. The gear shift arm-side locking member 81a is, when the gear shift arm 81 is viewed from the right side to the left side in the axial direction, provided in the left lower region, and extends in a circular-arc shape in the circumferential direction. The first doweled hole 81b is linked to a first doweled tooth 56a (to be described later) of the preload stopper collar 56. The first doweled hole 81b is formed as a concavity to the left side in a part adjacent to the insertion hole 81c in the oscillating rear anchor 81e. The first doweled hole 81b is, when the gear shift arm 81 is viewed from the right side to the left side in the axial direction, provided in a right lower region, extends in a circular-arc shape in the circumferential direction, and its central angle is about 60°.

The preload stopper collar 56 rotates integrally with the shift spindle 55 by engagement with the serration member 55b. As shown in FIGS. 9 to 12 and 16(a) and 16(b), the preload stopper collar 56 has a collar main body 56b, the first doweled tooth 56a and an inner peripheral serration member 56c. The collar main body 56b has an approximately cylindrical shape. The first doweled tooth 56a protrudes from a left end surface of the collar main body 56b to the left side. The first doweled tooth 56a extends in a circular-arc shape in the circumferential direction, and its central angle is about 45°.

The central angle of the first doweled tooth 56a is smaller than the central angle of the first doweled hole 81b. More specifically, there is a circular-arc backlash (gap, play) between the first doweled tooth 56a and the first doweled hole 81b in the circumferential direction.

The inner peripheral serration member 56c is provided on the inner peripheral member of the collar main body 56b, and is serration-engaged with the serration member 55b of the shift spindle 55. In a status where the inner peripheral serration member 56c is serration-engaged with the serration member 55b of the shift spindle 55, the right end surface of the collar main body 56b abuts on the thrust member 55a of the shift spindle 55.

The accumulation spring 57 presses the master arm 83 in an oscillating direction while accumulating the rotational force of the shift spindle 55 between the shift spindle 55 and the master arm 83. The phrase, "accumulating the rotational force" arbitrarily includes "accumulating the rotational angle (turning angle)". The accumulation spring 57 is capable of accumulating the rotational force transmitted from the shift spindle 55 to the master arm 83.

Figure 9:
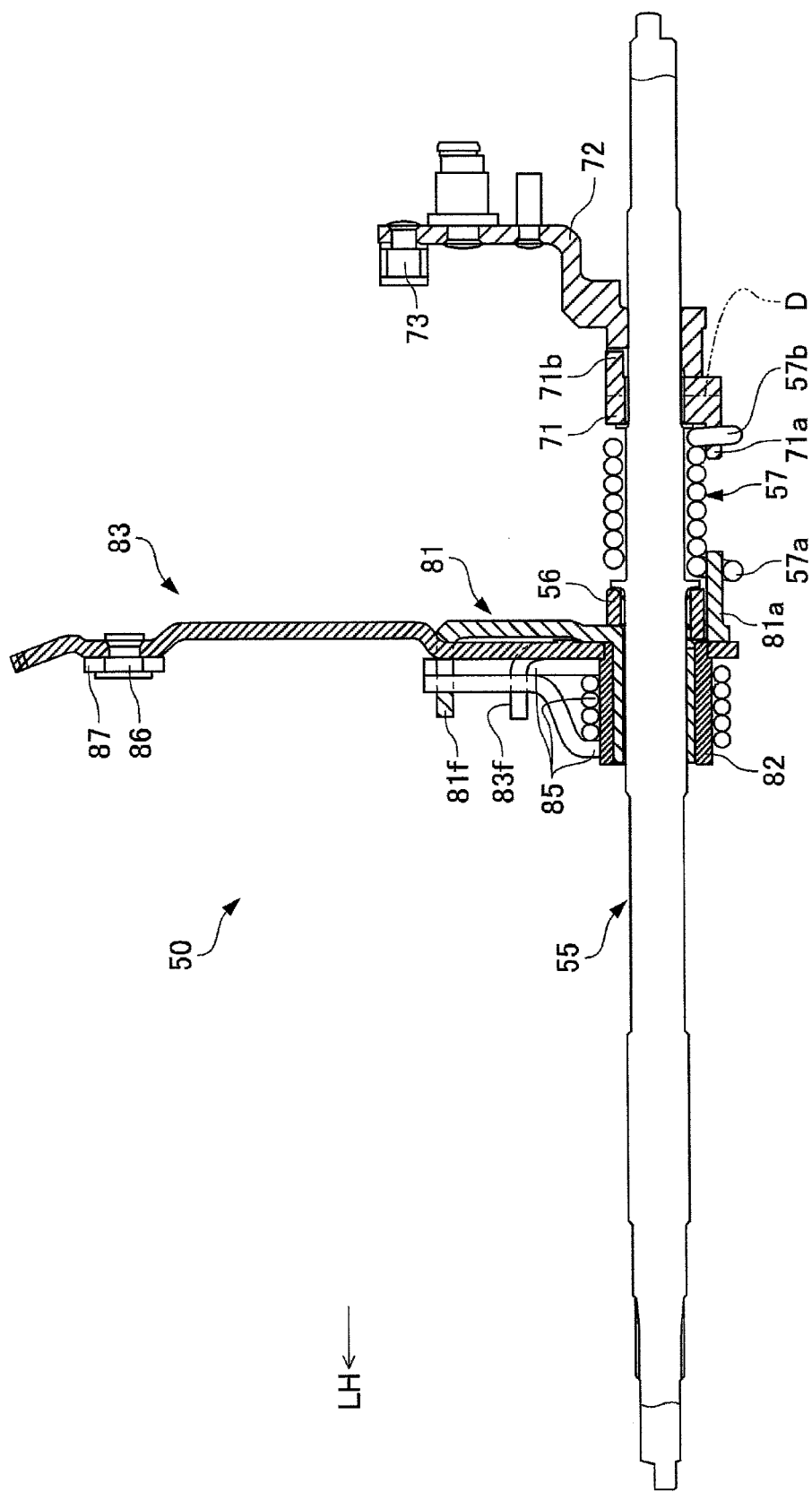
FIG. 9 is a cross-sectional view of principal elements of the transmission 50 cut along an axial direction of a shift spindle 55.
Figure 10:
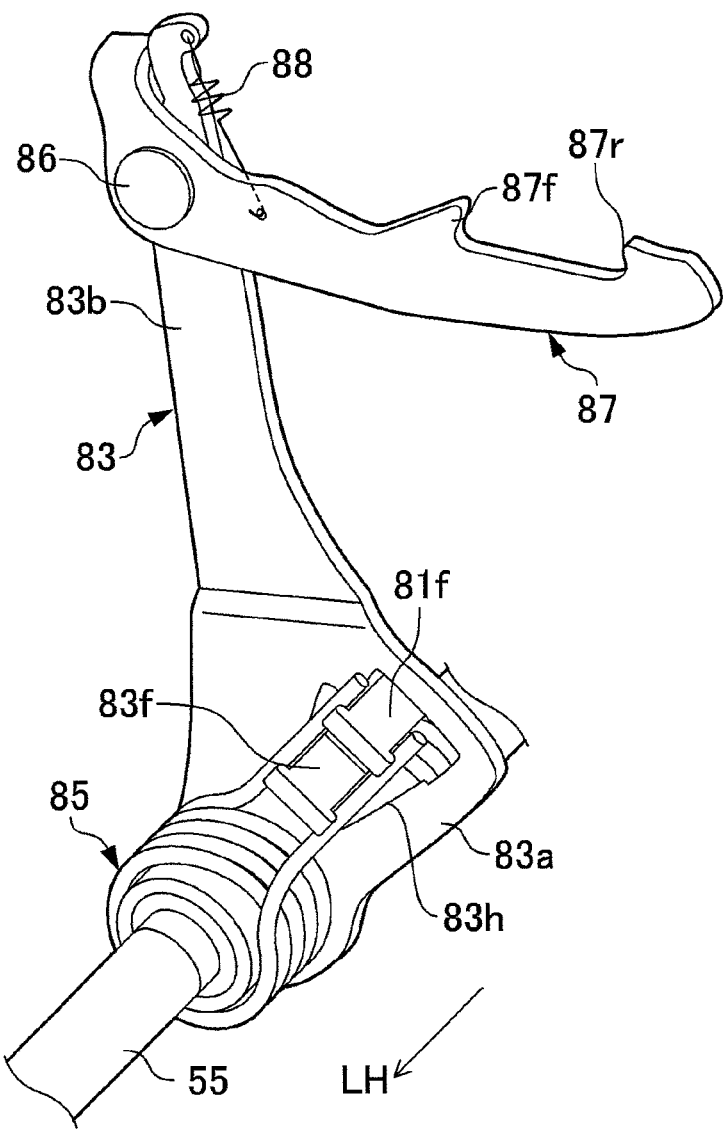
FIG. 10 is a partially-enlarged perspective view of a master arm 83 and the like in FIG. 9, viewed from the side of a shift return spring 85.
Figure 11:
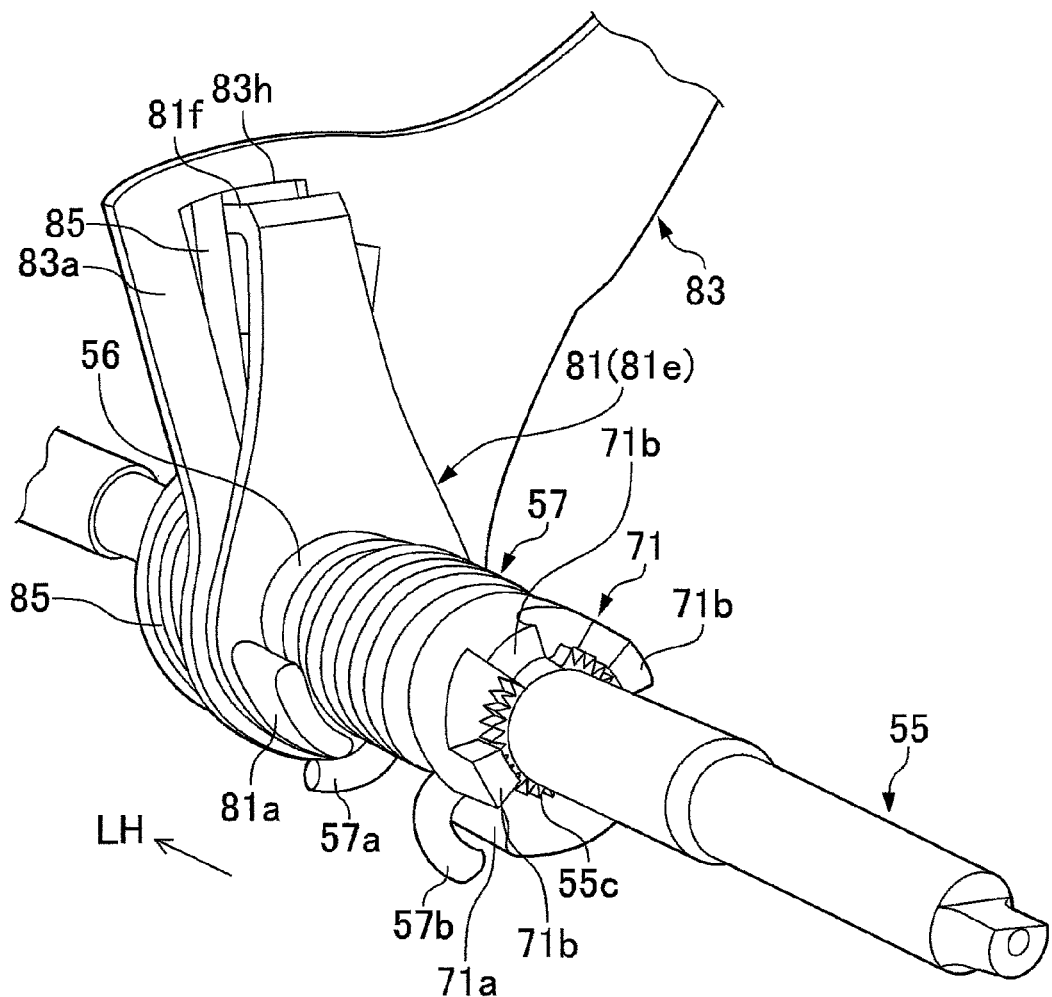
FIG. 11 is a partially-enlarged perspective view of a gear shift arm 81 and the like in FIG. 9, from which a clutch lever 72 is removed, and viewed from the side of an accumulation collar 71.
Figure 12:
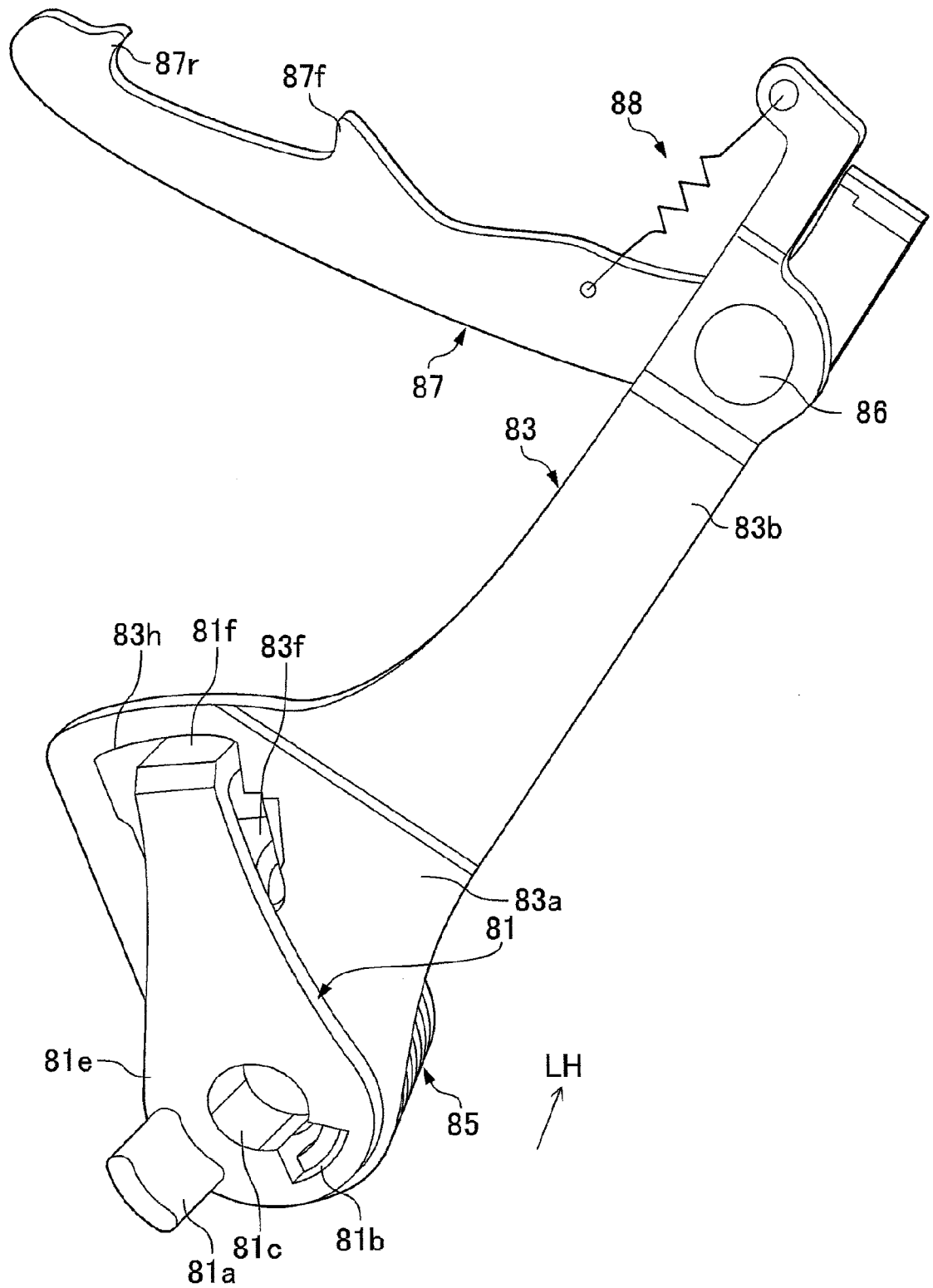
FIG. 12 is a partially-enlarged perspective view of the master arm 83 and the like in FIG. 9, from which a preload stopper collar 56 and the like are removed, and viewed from the side of the gear shift arm 81.
Figure 17:
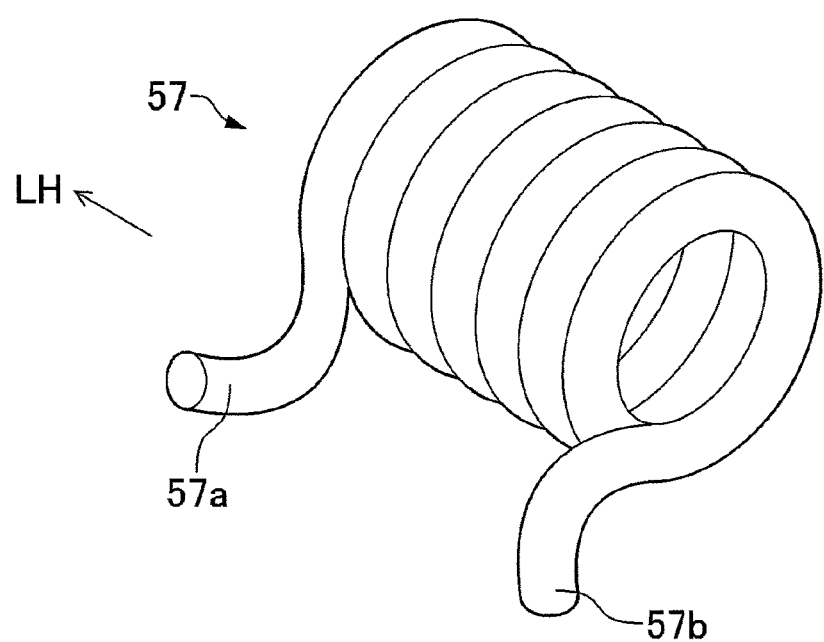
FIG. 17 is a perspective view of an accumulation spring 57.
Figure 18A:
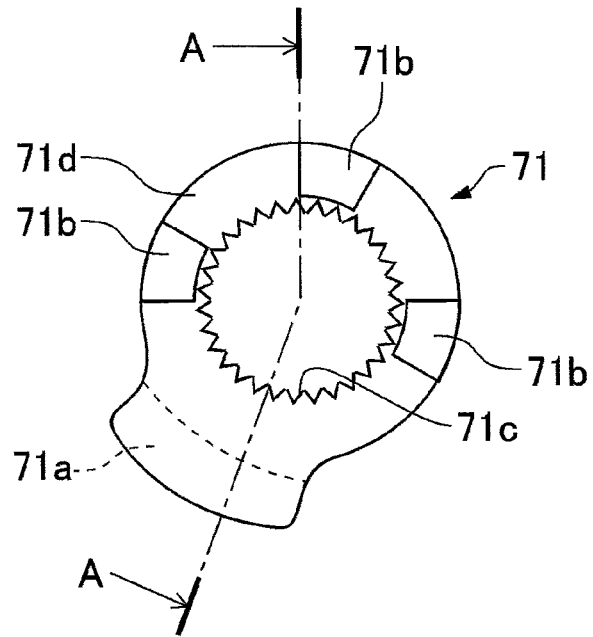
FIGS. 18(a) and 18(b) are diagrams showing the accumulation collar 71.
Figure 18B:
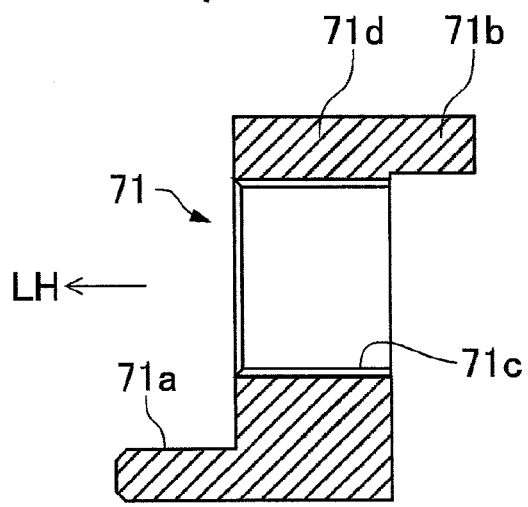
Figure 19A:
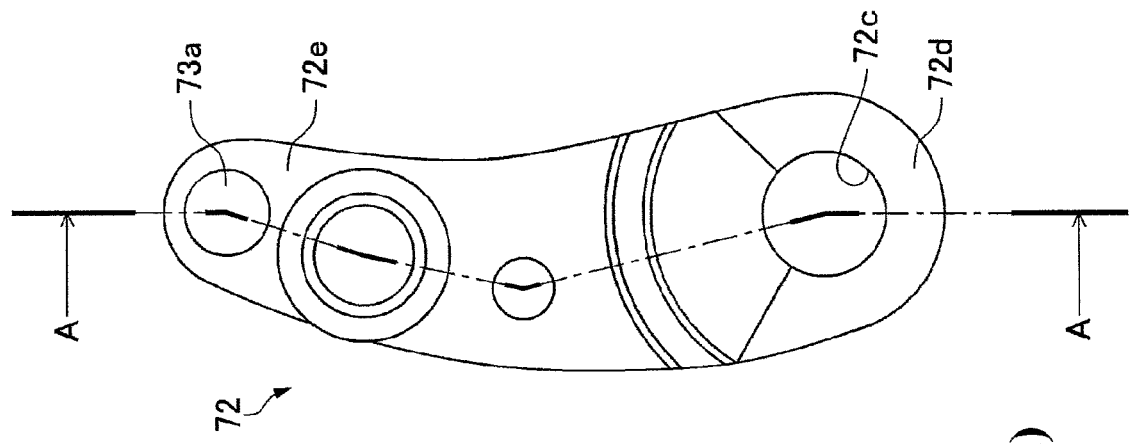
Figure 19B:
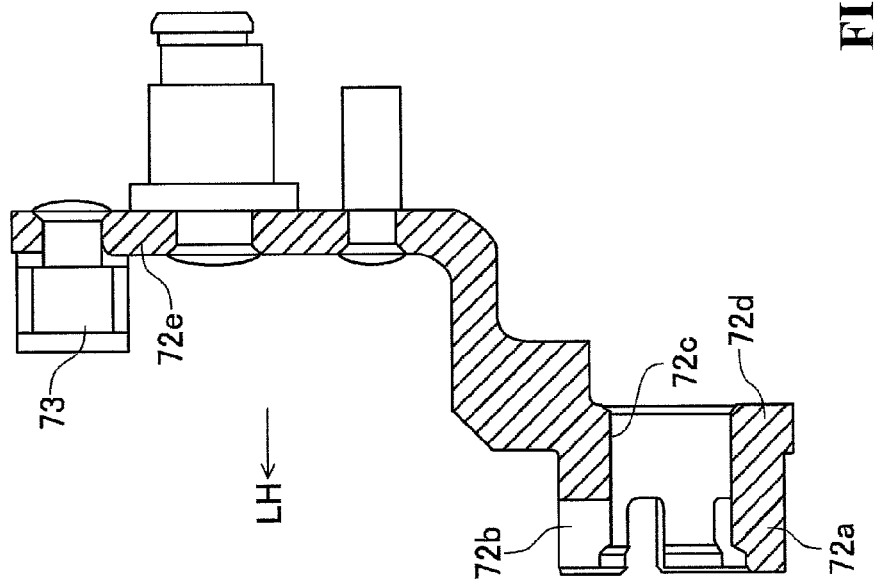
Figure 20B:
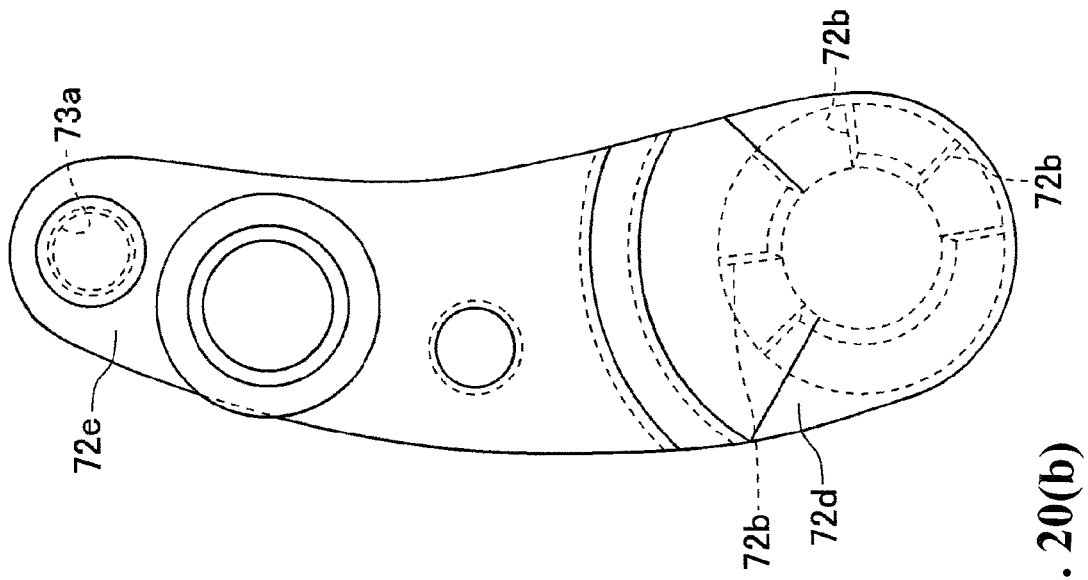
Figure 20A:
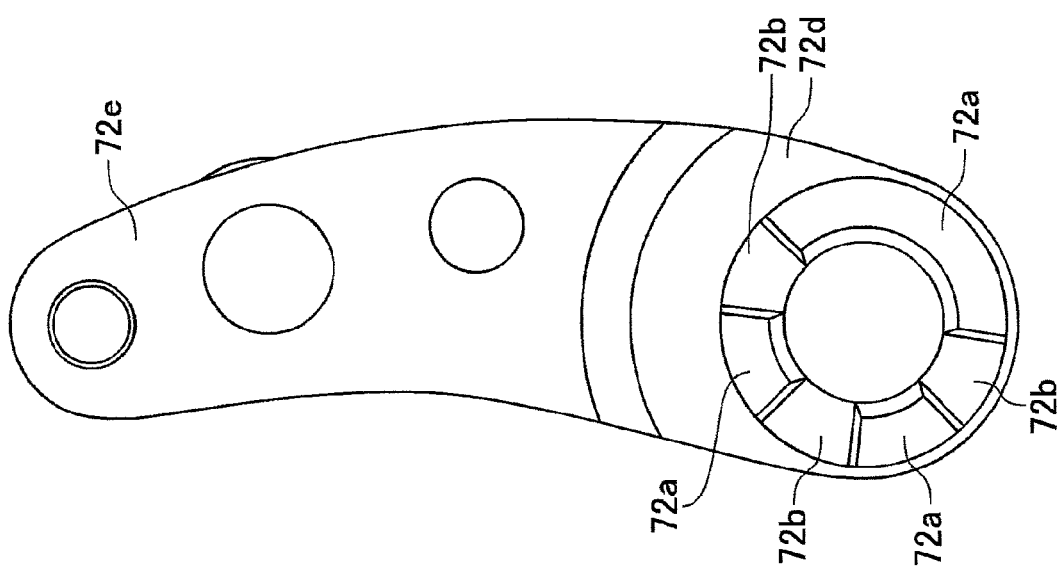

As shown in FIGS. 9, 11 and 17, the accumulation spring 57 has a coiled shape, and is provided so as to directly cover a peripheral surface of the shift spindle 55. The "directly cover" means that no other member exists between the accumulation spring 57 as an accumulation mechanism and the shift spindle 55.

In the accumulation spring 57, its one end 57a is locked with the gear shift arm-side locking member 81a, and its other end 57b is locked with an accumulation collar-side locking member 71a of the accumulation collar 71. The accumulation spring 57 gives a pressing force to rotate shift drum 90 to the shift up side.

As described above, the gear shift arm-side locking member 81a and the accumulation collar-side locking member 71a are formed with a boss extending in parallel with the axial direction of the shift spindle 55.

As shown in FIGS. 9, 11 and 18(a) and 18(b), the accumulation collar 71 is provided on the side of the clutch lever 72 with respect to the gear shift arm 81, and fixed to the shift spindle 55 and integrally rotated (pivoted).

The accumulation collar 71 has a collar main body 71d, the accumulation collar-side locking member 71a, a second doweled tooth 71b and an inner peripheral serration member 71c.

The collar main body 71d has an approximately cylindrical shape. The accumulation collar-side locking member 71a protrudes from a left end surface of the collar main body 71d to the left side. The accumulation collar-side locking member 71a extends in a circular-arc shape in the circumferential direction, and its central angle is about 60°.

The second doweled tooth 71b protrudes from the right end surface of the collar main body 71d to the right side, and is linked to the second doweled hole 72b (to be described later) of the clutch lever 72. The second doweled tooth 71b extends in a circular-arc shape in the circumferential direction, and its central angle is about 30°. The second doweled tooth 71b is provided in three positions away from each other in the circumferential direction. The angle between adjacent second doweled teeth 71b in the circumferential direction is about 90°. When the accumulation collar 71 is viewed in the axial direction, the accumulation collar-side locking member 71a and the three second doweled tooth 71b are provided in non-overlapped positions.

The inner peripheral serration member 71c is provided on the inner peripheral part of the collar main body 71d, and is serration-engaged with the serration member 55c of the shift spindle 55.

Note that in the present embodiment, the accumulation collar 71 is integrally formed, however, it is not limited to this arrangement. For example, the accumulation collar 71, in a position indicated with an alternate long and two short dashes line D in FIG. 9, may be formed with separate body members divided in the axial direction on the side of the accumulation collar-side locking member 71a and the side of the second doweled tooth 71b.

As shown in FIGS. 9, 19(a), 19(b) and 20(a) and 20(b), the clutch lever 72 is rotatably supported with the shift spindle 55, and operates the clutch 60. The clutch lever 72 has a rear anchor 72d, a lever 72e, a wall 72a, the second doweled hole 72b and an insertion hole 72c.

The lever 72e extends from the rear anchor 72d. Three second doweled holes 72b and three walls 72a are provided on the left end side of the rear anchor 72d.

The three second doweled hole 72b are provided in positions corresponding to the three second doweled tooth 71b in the accumulation collar 71. The second doweled tooth 71b is inserted in the second doweled hole 72b. That is, the second doweled tooth 71b and the second doweled hole 72b are linked to each other.

The second doweled hole 72b extends in a circular-arc shape in the circumferential direction, and its central angle is about 40° which is wider than the central angle of the second doweled tooth 71b. More specifically, there is backlash (gap, play) in a circular-arc shape between the second doweled tooth 71b and the second doweled hole 72b in the circumferential direction. The above-described delay mechanism is formed with this backlash (gap, play) in the circumferential direction.

The wall 72a is provided between adjacent second doweled holes 72b in the circumferential direction.

The insertion hole 72c is provided to be inserted through the inside of the rear anchor 72d along the axial direction of the clutch lever 72. The shift spindle 55 is inserted through the insertion hole 72c.

Further, as shown in FIGS. 7 and 9, the gear shift arm-side locking member 81a and the accumulation collar-side locking member 71a are provided on the opposite side to the clutch 60 with respect to the axial direction of the shift spindle 55. The clutch lever 72 and the master arm 83 are provided opposite to each other in the axial direction of the shift spindle 55, with the clutch 60 therebetween. In shift operation, the master arm 83 and the clutch lever 72 are interlocked with each other. The details of the interlocked operation will be described later.

Next, the interlocked operation between the master arm 83 and the clutch lever 72 in the shift operation with the transmission 50 will be described with reference to FIGS. 21(a) to 27.

Figures 21A, 21B:
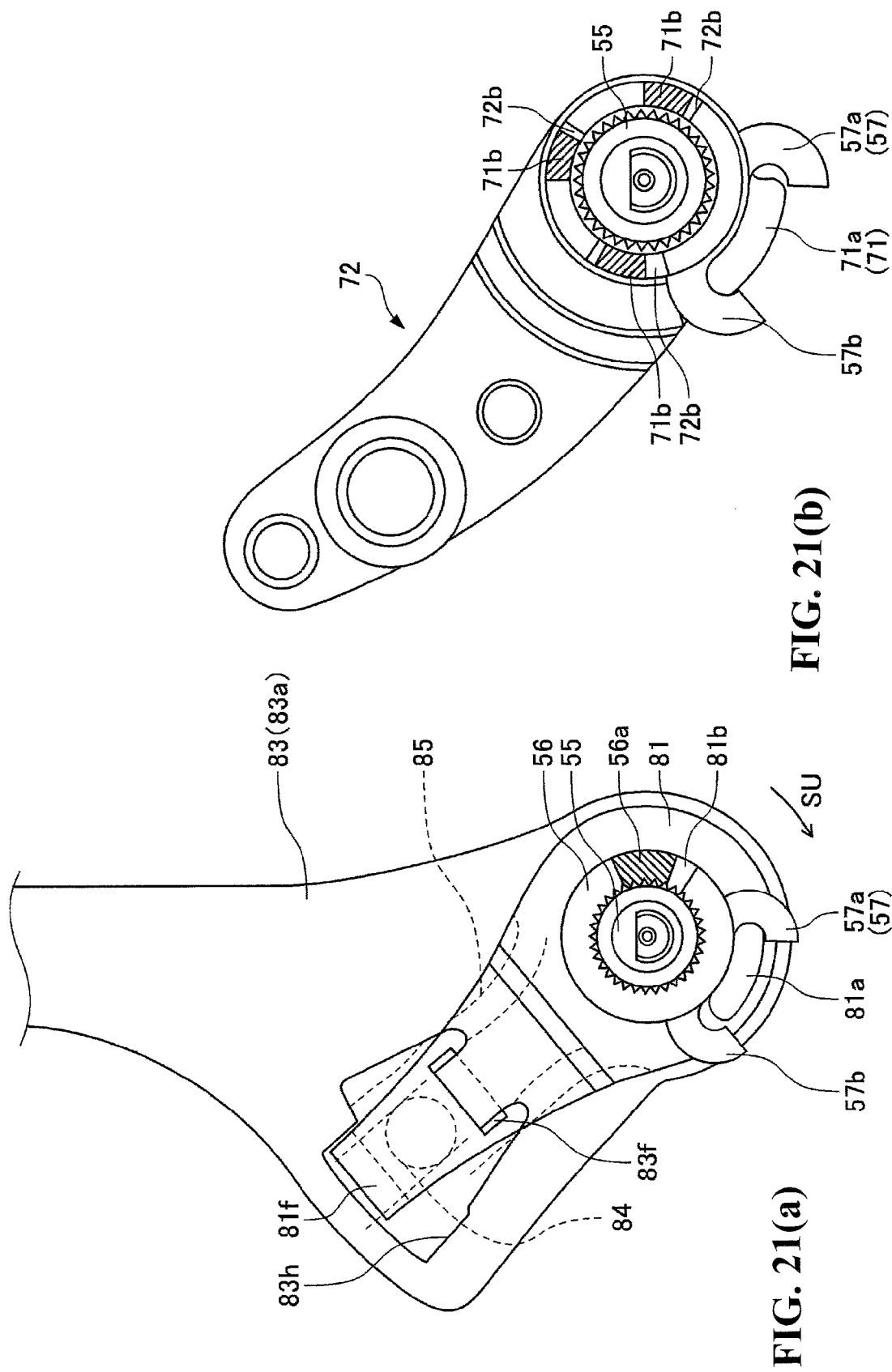
FIGS. 21(a) and 21(b) are diagrams showing a change of positional relation and the like of respective constituent elements accompanying a shift operation.

In this example, the shift operation upon shift up will be described. FIGS. 21(a) and 21(b) show a status before the start of the shift operation. It is a status corresponding to the "start" in FIG. 27.

Figure 27:
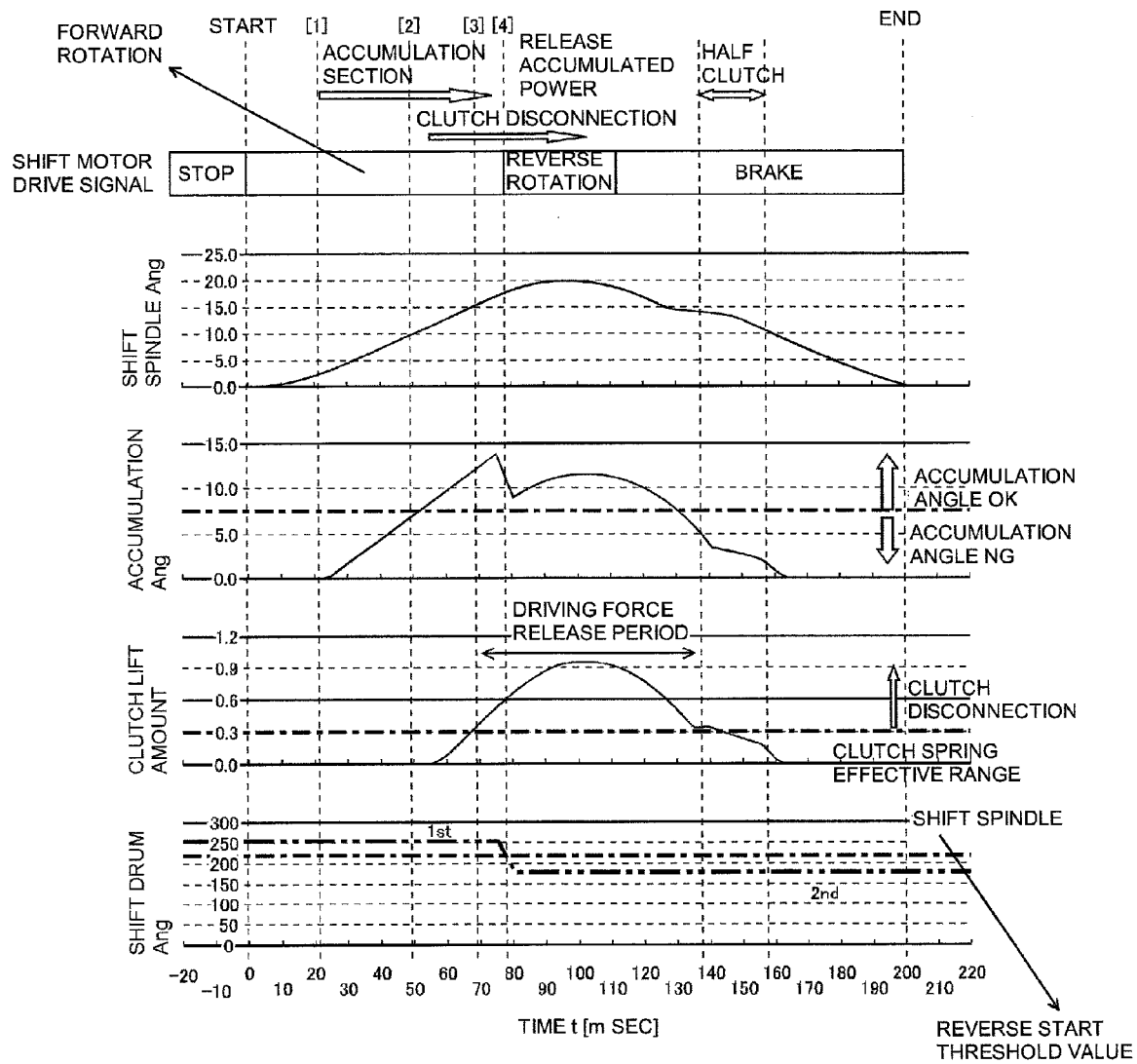
FIG. 27 is a diagram showing the relation among a shift spindle angle, an accumulation spring angle, a clutch lift amount, a shift drum angle and the like accompanying the progress of the shift operation.

Note that FIG. 27 shows changes of the shift spindle 55 angle (Ang), the accumulation spring 57 angle (Ang), the clutch lift amount, the shift drum 90 angle (Ang) accompanying the progress of the shift operation and their relation.

As shown in FIG. 21(a), before the start of the shift operation, a gap (backlash) in a shift up direction SU exists between the spring locking piece 81f of the gear shift arm 81 and regulation opening 83h of the master arm 83. There is a gap (backlash) in the shift up direction SU between the first doweled tooth 56a of the preload stopper collar 56 and the first doweled hole 81b of the gear shift arm 81. There is no gap (backlash) in the shift up direction SU between the one end 57a of the accumulation spring 57 and the gear shift arm-side locking member 81a of the gear shift arm 81. Note that the shift up direction SU is a clockwise direction in FIGS. 21(a) to 26(b).

Further, as shown in FIG. 21(b), there is a gap (backlash) in the shift up direction SU between the second doweled tooth 71b of the accumulation collar 71 and the second doweled hole 72b of the clutch lever 72. There is no gap (backlash) in the shift up direction SU between the accumulation collar-side locking member 71a of the accumulation collar 71 and the other end 57b of the accumulation spring 57.

When the rotation of the shift spindle 55 starts from the status before the start of the shift operation shown in FIG. 21, the status becomes that shown in FIGS. 22(a) and 22(b). FIGS. 22(a) and 22(b) show a status corresponding to [1] in FIG. 27.

When the shift spindle 55 rotates, the accumulation collar 71 integrated with the shift spindle also rotates. In the status before the start of the shift operation shown in FIGS. 21(a) and 21(b), the accumulation spring 57 abuts on the accumulation collar 71 and the gear shift arm 81. Accordingly, in the status shown in FIGS. 22(a) and 22(b), when the accumulation collar 71 rotates, the accumulation spring 57 which abuts on the accumulation collar 71 also integrally rotates, and immediately the gear shift arm 81 which abuts on the accumulation spring 57 also rotates.

As shown in FIG. 22(a), the gear shift arm 81 rotates in the shift up direction SU, the spring locking piece 81f abuts on the regulation opening 83h of the master arm 83. Further, the preload stopper collar 56 (integrated with the shift spindle 55) rotates in the shift up direction SU, the first doweled tooth 56a of the preload stopper collar 56 moves inside the first doweled hole 81b of the gear shift arm 81 in the circumferential direction. As shown in FIG. 22(b), the accumulation collar 71 (integrated with the shift spindle 55) rotates in the shift up direction SU, and further, causes the accumulation spring 57 to rotate in the shift up direction SU via the accumulation collar-side locking member 71a and the other end 57b.

It is arranged such that the gear shift arm 81 does not rotate when the clutch 60 is in the connected status and the drive force is generated. That is, the gear shift arm-side locking member 81a does not move. Accordingly, accumulation is started in the accumulation spring 57 where the one end 57a is locked with the gear shift arm-side locking member 81a.

Note that in FIG. 22(a), as the rotational angle of the preload stopper collar 56 is minute, it almost does not appear. In FIG. 22(b), as the rotational angle of the accumulation collar 71 is minute, it almost does not appear.

Figure 23A:
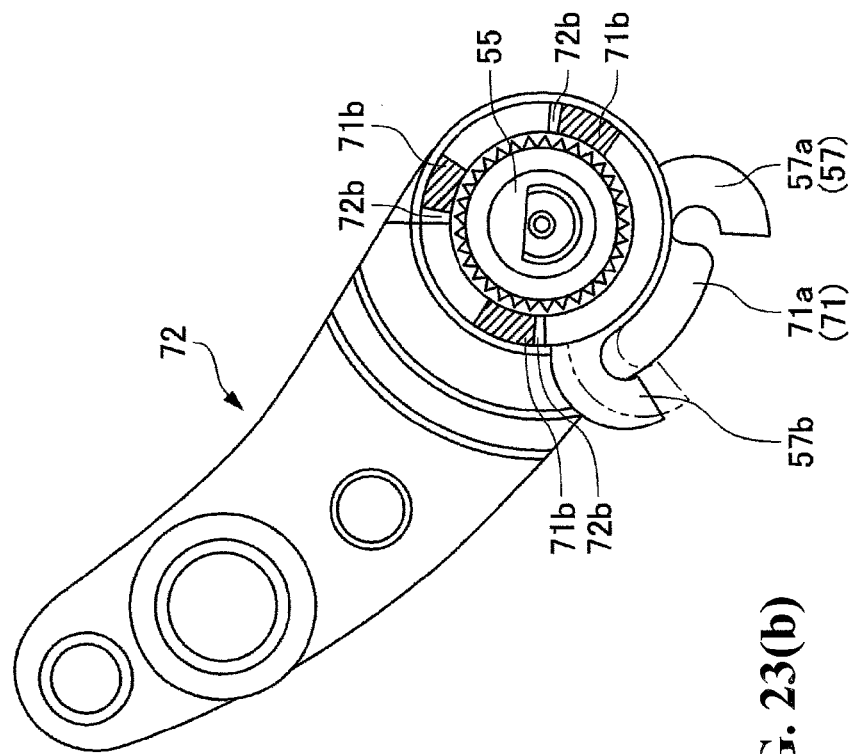
FIGS. 23(a) and 23(b) are diagrams showing a status where the shift operation has progressed from FIGS. 22(a) and 22(b)
Figure 23B:
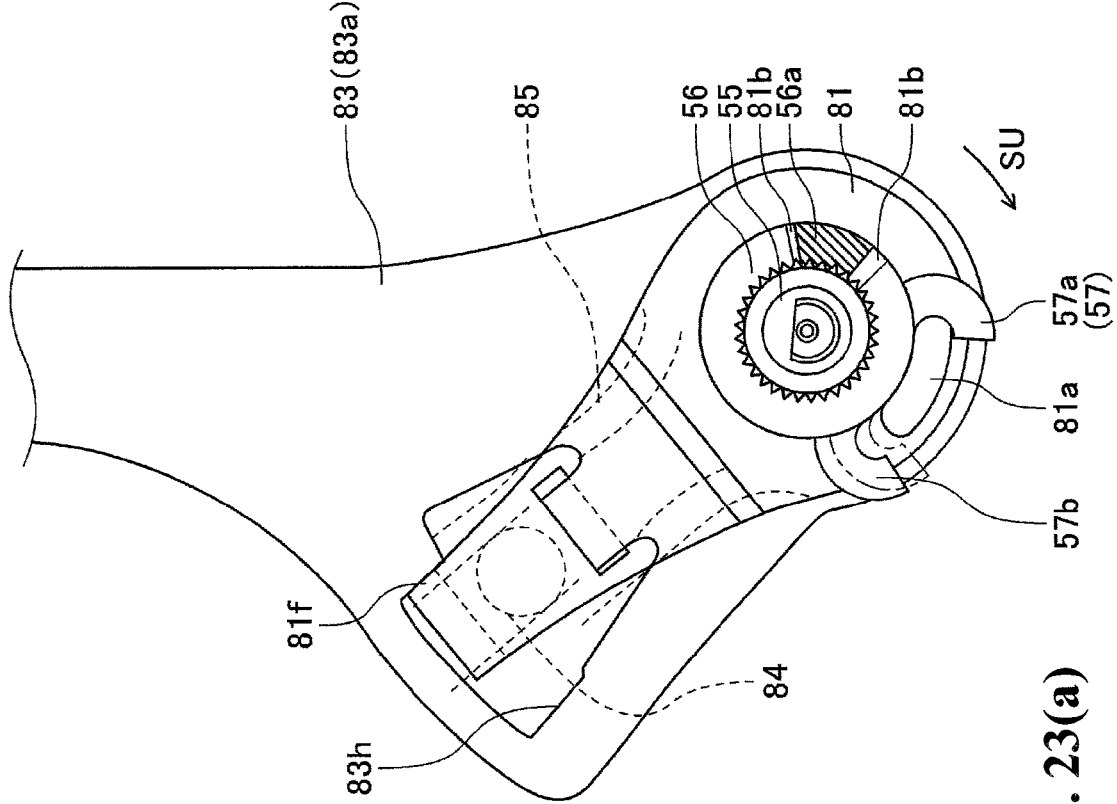

When the rotation of the shift spindle 55 progresses from the status shown in FIGS. 22(a) and 22(b), the status is as shown in FIGS. 23(a) and 22(b). FIGS. 23(a) and 23(b) correspond to a status between [1] and [2] in FIG. 27.

As shown in FIG. 23(a), the preload stopper collar 56 further rotates in the shift up direction SU from the position shown in FIG. 22(a), and the first doweled tooth 56a of the preload stopper collar 56 further moves in the circumferential direction inside the first doweled hole 81b of the gear shift arm 81 from the position shown in FIG. 22(a). As a result, the accumulation progresses in the accumulation spring 57.

Further, as shown in FIG. 23(b), the second doweled tooth 71b of the accumulation collar 71 moves in the circumferential direction until there is no gap (backlash) with respect to the second doweled hole 72b of the clutch lever 72.

Figure 24B:
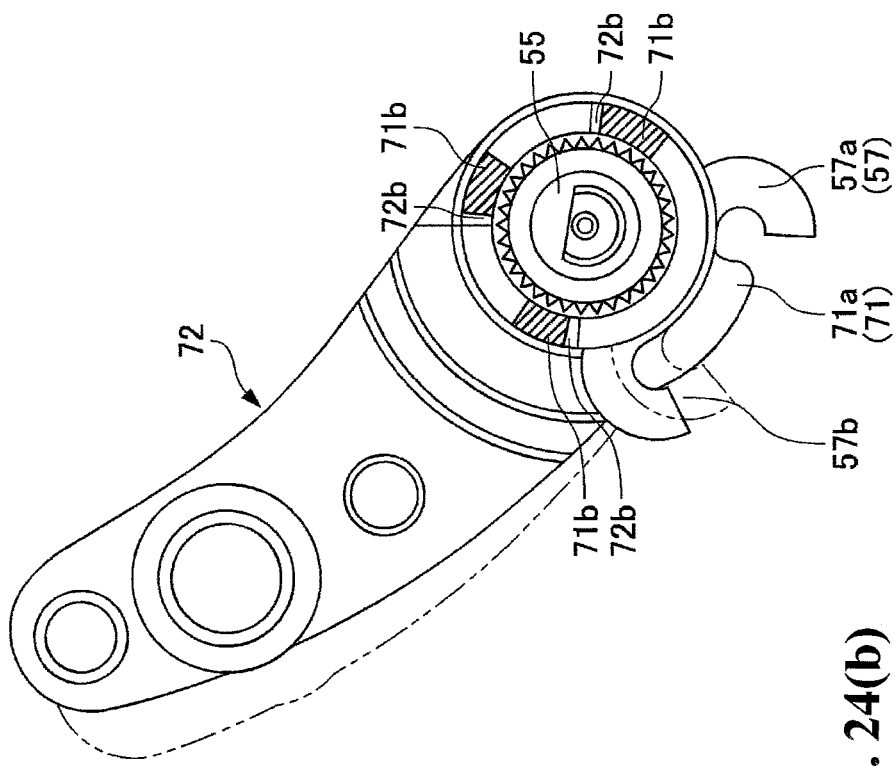
FIGS. 24(a) and 24(b) are diagrams showing a status where the shift operation has progressed from FIGS. 23(a) and 23(b)
Figure 24A:
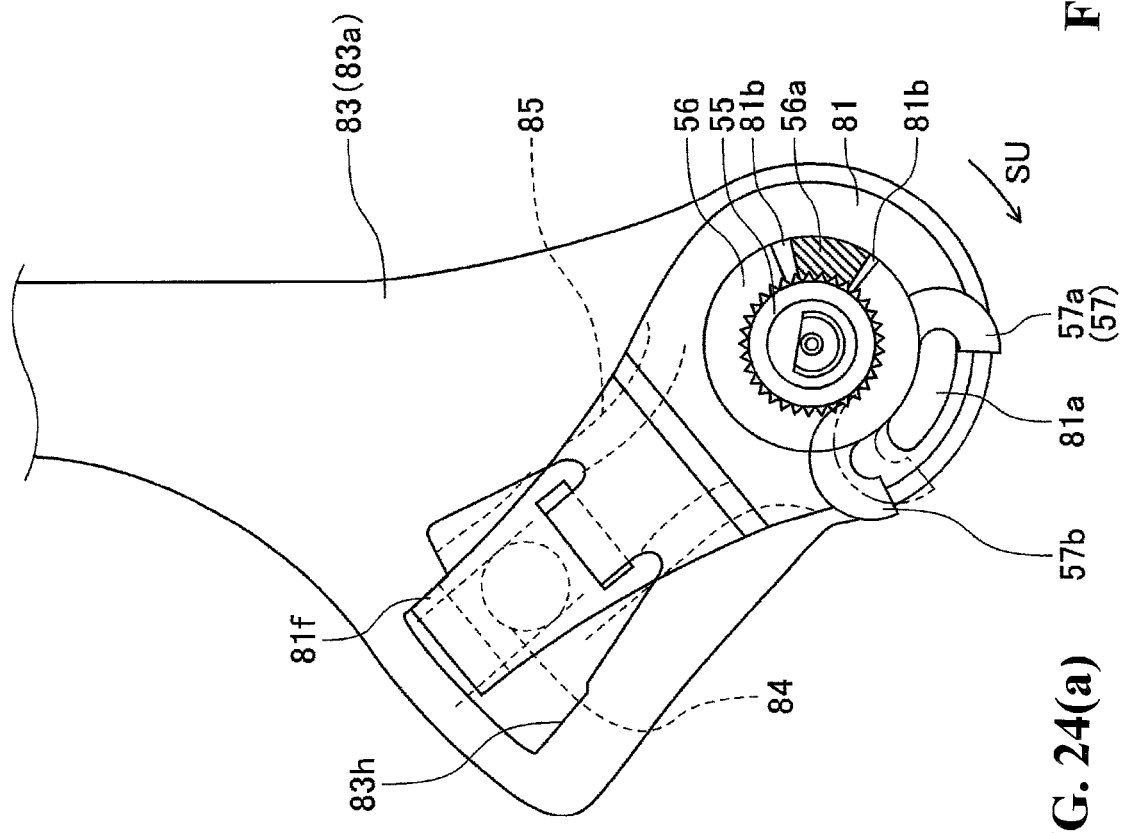

When the rotation of the shift spindle 55 progresses from the status shown in FIGS. 23(a) and 23(b), the status is as shown in FIGS. 24(a) and 24(b). FIGS. 24(a) and 24(b) correspond to a status between [2] and [3] in FIG. 27.

As shown in FIG. 24(a), the preload stopper collar 56 further rotates in the shift up direction SU from the position shown in FIG. 23(a), and the first doweled tooth 56a of the preload stopper collar 56 further moves in the circumferential direction inside the first doweled hole 81b of the gear shift arm 81 from the position shown in FIG. 23(a). As a result, the accumulation progresses in the accumulation spring 57, thus the accumulation in a sufficient amount to rotate master arm 83 is completed.

Further, as shown in FIG. 24(b), when there is no gap (backlash) with respect to the second doweled hole 72b of the clutch lever 72, the rotation of the clutch lever 72 is started, and as a result, disconnection (clutch lift) of the clutch 60 is started via the roller 73, the operation lever 74 and the like.

Figure 25A:
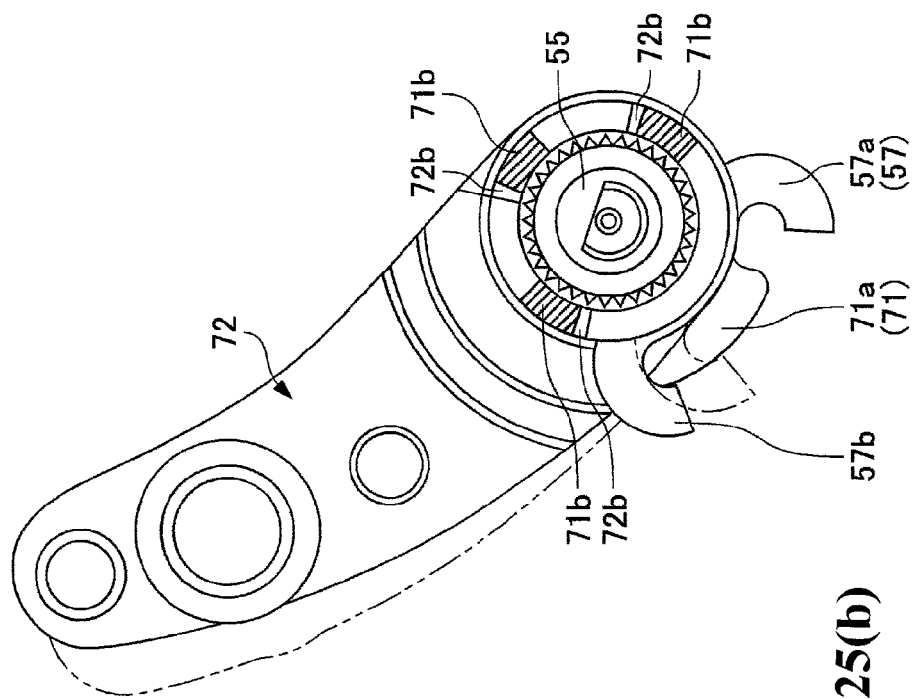
FIGS. 25(a) and 25(b) are diagrams showing a status where the shift operation has progressed from FIGS. 24(a) and 25(b)
Figure 25B:
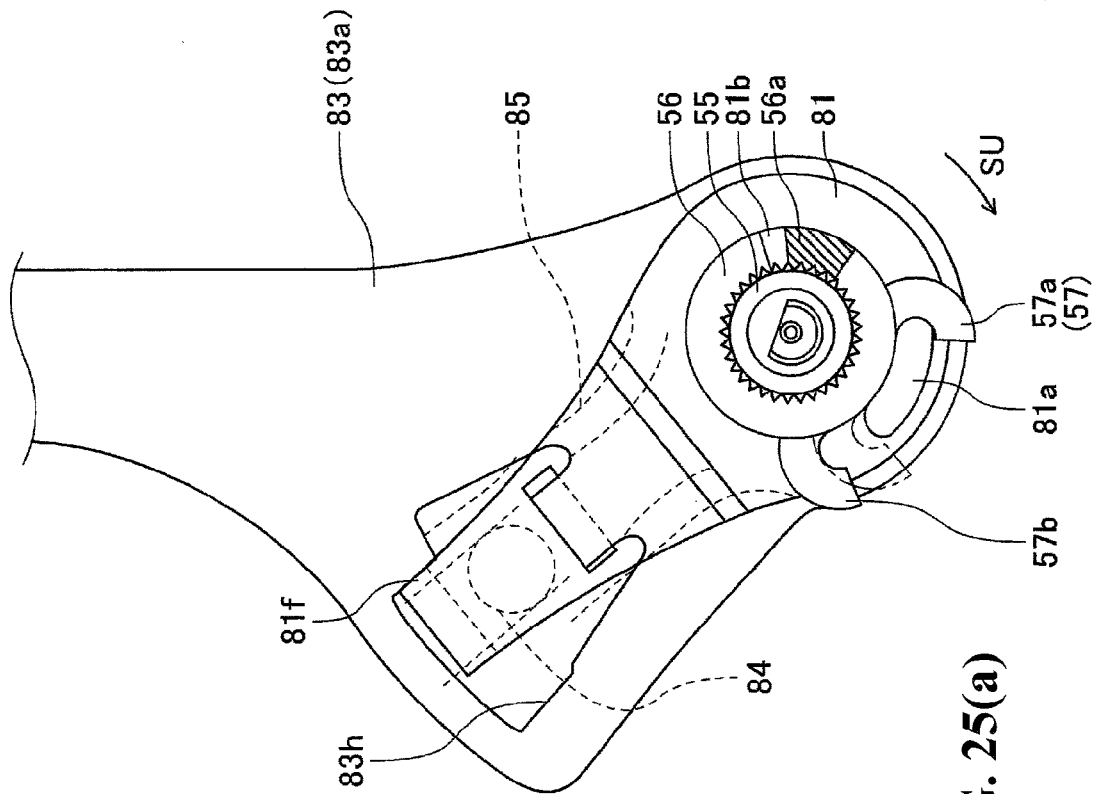

When the rotation of the shift spindle 55 progresses from the status shown in FIGS. 24(a) and 24(b), the status is as shown in FIGS. 25(a) and 25(b). FIGS. 25(a) and 25(b) correspond to [3] in FIG. 27.

As shown in FIG. 25(a), the preload stopper collar 56 further rotates in the shift up direction SU from the position shown in FIG. 24(a), and the first doweled tooth 56a of the preload stopper collar 56 further moves in the circumferential direction inside the first doweled hole 81b of the gear shift arm 81 from the position shown in FIG. 24(a). As a result, the accumulation in the accumulation spring 57 progresses until there is no gap (backlash) between the first doweled tooth 56a and the first doweled hole 81b, and the accumulation in a sufficient amount to rotate the master arm 83 is performed.

Further, when the clutch 60 is sufficiently disconnected, the drive force is reduced to a released status. As a result, the rotation of the shift drum 90 and the rotation of the gear shift arm 81 become possible.

Figure 26B:
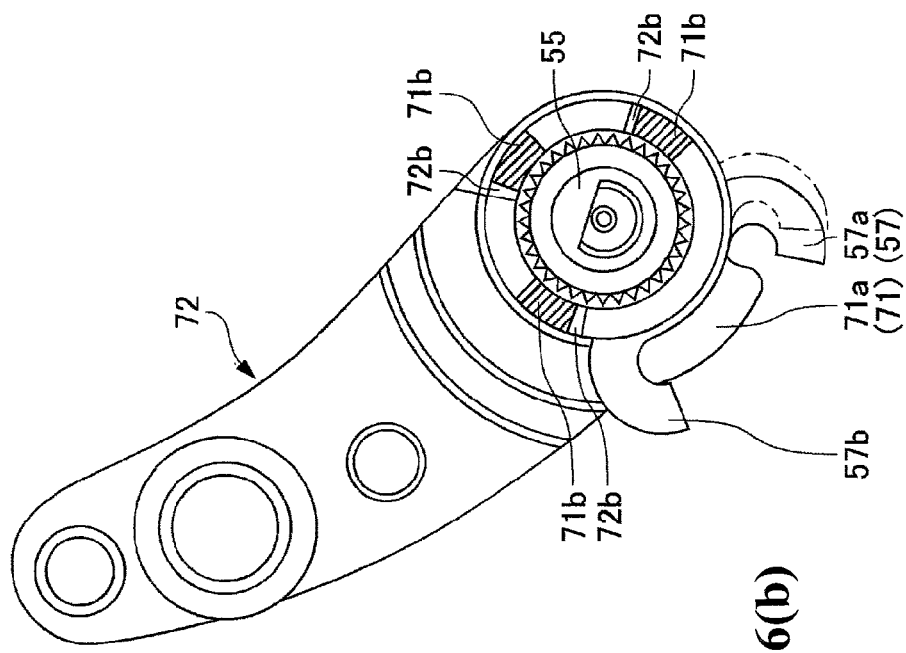
FIGS. 26(a) and 26(b) are diagrams showing a status where the shift operation has progressed from FIGS. 25(a) and 25(b)
Figure 26A:
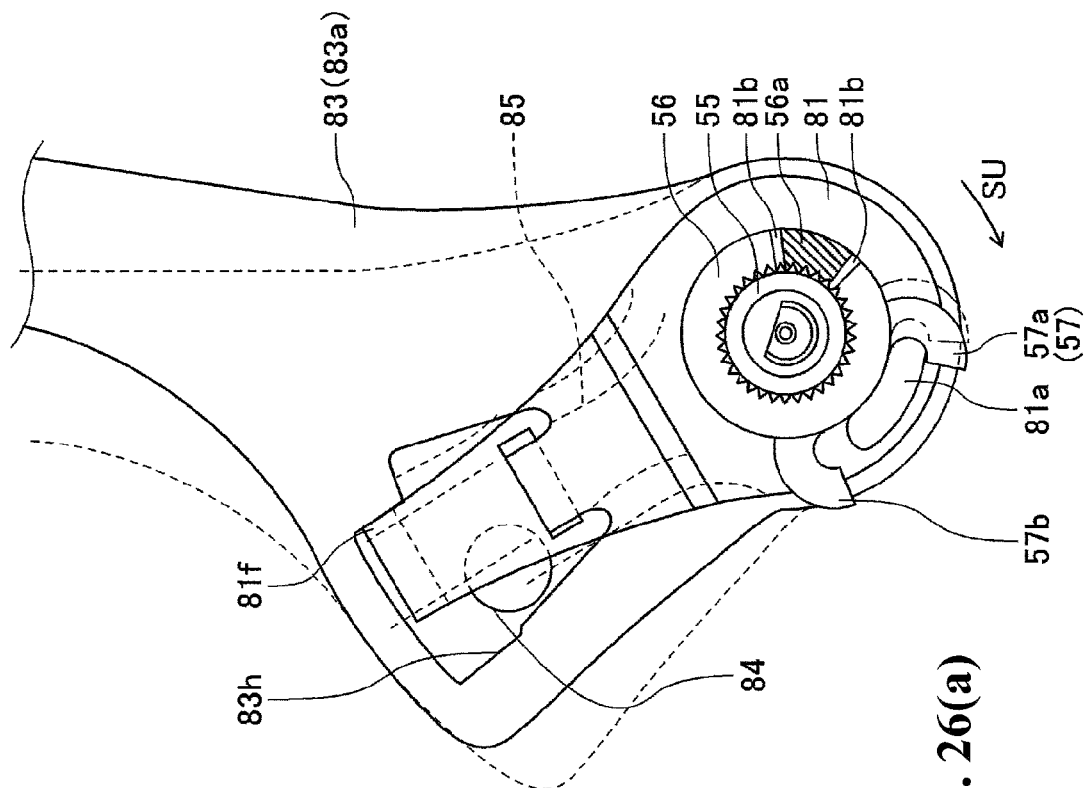

When the rotation of the shift spindle 55 progresses from the status shown in FIGS. 25(a) and 25(b), the status is as shown in FIGS. 26(a) and 26(b). FIGS. 26(a) and 26(b) correspond to a status between [3] and [4] in FIG. 27.

In the status where the drive force is released, the accumulation in the accumulation spring 57 is released, and with the accumulation, the master arm 83 immediately rotates. With the rotation of the master arm 83, the shift drum 90 rotates, and shift up is performed. When the rotational angle of the shift drum 90 exceeds a predetermined reverse start threshold value, the shift spindle 55 starts reverse (starts rotation in a shift down direction). Further, the rotation of the master arm 83 stops when the regulation pin 84 abuts on the regulation opening 83h.

As described above, the delay mechanism delays the disconnection operation of the clutch 60 with the clutch lever 72 until the accumulation in the accumulation spring 57 is completed. Further, the delay mechanism functions as a lost mechanism not to contribute a part of the rotational angle of the shift spindle 55 to the disconnection operation in the clutch 60 with the clutch lever 72.

Further, by changing the relative position between the clutch lifter plate 77 and the clutch adjustment bolt 76, it is possible to increase and decrease the interval between opposed surfaces of the clutch lifter plate 77 and the rear anchor disc member 74b of the operation lever 74. With this arrangement, it is possible to increase and decrease the backlash in the moving direction in the clutch lifter mechanisms 74 to 79. For example, when the backlash is large, the moving amount of the clutch lifter mechanisms 74 to 79 required to disconnect the clutch 60 becomes larger in comparison with a case where the backlash is small. By utilizing this relation, the delay mechanism may be arranged in accordance with backlash in the moving direction in the clutch lifter mechanisms 74 to 79 to perform disconnection of the clutch 60 by moving with respect to the clutch 60.

According to the transmission 50 in the present embodiment, for example, following advantages are obtained.

The transmission 50 in the present embodiment has the master arm 83 which transmits the rotational force of the shift spindle 55 to the shift drum 90 so as to rotate and operate the shift drum 90, the clutch lever 72 to operate the clutch 60, the accumulation spring 57 as an accumulation mechanism capable of accumulating the rotational force transmitted from the shift spindle 55 to the master arm 83, and the delay mechanism to delay the disconnection operation of the clutch 60 with the clutch lever 72 until the accumulation is completed.

Then according to the transmission 50 in the present embodiment, as the accumulation can be completed before the disconnection operation of the clutch 60, it is possible to more reliably realize the disconnection of the clutch 60 after the completion of the accumulation necessary for the shift operation. Accordingly, it is possible to more reliably perform quick shift operation after the disconnection of the clutch 60.

In the transmission 50 in the present embodiment, the delay mechanism functions as a lost mechanism not to contribute a part of the rotational angle of the shift spindle 55 to the disconnection operation of the clutch 60 with the clutch lever 72. Then according to the transmission 50 in the present embodiment, it is possible with the lost mechanism to easily complete the accumulation before the disconnection operation of the clutch 60.

In the transmission 50 in the present embodiment, the clutch lever 72 and the accumulation collar 71 as a delay member have the mutually interlocked second doweled tooth 71b and second doweled hole 72b. The delay mechanism is formed with the interval in the circumferential direction between the second doweled tooth 71b and the second doweled hole 72b. Then according to the transmission 50 in the present embodiment, the delay mechanism has a compact and simple structure.

In the transmission 50 in the present embodiment, the delay mechanism is formed with the backlash in the moving direction in the clutch lifter plate 77 as a clutch lifter member which performs disconnection of the clutch 60 by moving with respect to the clutch 60. Then according to the transmission 50 in the present embodiment, the delay mechanism has a simple structure.

In the transmission 50 in the present embodiment, the shift spindle 55 and the accumulation collar 71 integrally rotate. Accordingly, when the shift spindle 55 rotates, it is possible to quickly rotate the master arm 83 via the accumulation collar 71, the accumulation spring 57 and the like.

In the transmission 50 in the present embodiment, the accumulation spring 57 as an accumulation mechanism is provided so as to directly cover the peripheral surface of the shift spindle 55. Accordingly, the accumulation mechanism has a compact structure.

Next, the first through the fifth modifications of the motorcycle according to the present invention will be described with reference to the drawings. The delay mechanism is not limited to a mechanism the functions as a lost mechanism not to contribute a part of the rotational angle of the shift spindle 55 to the disconnection operation of the clutch 60 with the clutch lever 72, as in the case of the above-described embodiment. Note that in the description of the modifications, the same constituent elements as those in the above-described embodiment have the same reference numerals, and the explanations thereof will be omitted or simplified.

FIGS. 28(a) to 28(c) are right side views showing structures and operations of principle parts of the delay mechanism according to a first modification. In the first modification, as shown in FIGS. 28(a) to 28(c), the clutch lever 72 is linked to the clutch lifter cam 74 via the guide hole 74c provided in the clutch lifter cam 74. Further, the delay mechanism is provided as an backlash hole 74d of the guide hole 74c.

More particularly, the roller 73 of the clutch lever 72 is provided and engaged with the guide hole 74c. The distorted long-hole type guide hole 74c has the backlash hole 74d at its central part. The backlash hole 74d extends along the rotational direction (the moving direction of the roller 73) R1 of the clutch lever 72. Accordingly, even when the clutch lever 72 rotates in a status where the roller 73 is positioned in the backlash hole 74d, the roller 73 merely moves in the extending direction of the backlash hole 74d, and the clutch lifter cam 74 does not or almost does not rotate.

On the other hand, in the guide hole 74c, a part adjacent to the backlash hole 74d extends in a direction different from the rotational direction (the moving direction of the roller 73) R1 of the clutch lever 72. Accordingly, in a status where the roller 73 is positioned in the adjacent part, when the clutch lever 72 rotates, then interlocked with the rotation, the roller 73 presses the adjacent part, and the clutch lifter cam 74 immediately rotates.

Next, the operation of the clutch lifter cam 74 in the modification 1 will be described. As shown in FIG. 28(a), the roller 73 of the clutch lever 72 is positioned in the backlash hole 74d. As shown in FIGS. 28(a) and 28(b), when the clutch lever 72 rotates in the rotational direction R1, the roller 73 moves in the extending direction of the backlash hole 74d. Before the roller 73 arrives at the end of the backlash hole 74d, the clutch lifter cam 74 does not or almost does not rotate. That is, the delay function works.

When the clutch lever 72 further rotates from the status where the roller 73 has arrived at the end of the backlash hole 74d shown in FIG. 28(b), the roller 73 starts to press the guide hole 74c. Accordingly, as shown in FIG. 28(c), the clutch lifter cam 74 rotates in the rotational direction R2, and by extension, the clutch lifter plate 77 (not shown in FIG. 28) also rotates in the rotational direction R2. With this arrangement, the disconnection (clutch lift) of the clutch 60 is performed.

According to the first modification, the delay mechanism is provided as the backlash hole 74d of the guide hole 74c. Accordingly, it is possible to increase the size of the guide hole 74c (especially it is possible to prolong the guide length). Accordingly, it is possible to easily set and manage the accuracy of the delay function of the delay mechanism.

FIGS. 29(a) and 29(b) are diagrams showing the principal parts of the delay mechanism according to a second modification. FIG. 29(a) is a right side view. FIG. 29(b) is a view taken along line A-A cross-sectional view shown in FIG. 29(a). In the second modification, as shown in FIG. 29(a), the clutch lever 72 is linked to the clutch lifter cam 74. Note that different from the first modification, the distorted long-hole shaped guide hole 74c of the clutch lifter cam 74 in the modification 2 does not have the backlash hole 74d.

The clutch lifter cam 74 has groove lines 74v a plurality of (three) valley-shaped slope plates. As shown in FIGS. 29(a) and 29(b), the groove lines 74v are linked to the clutch lifter plate 77 via the three release balls 79 as ball-shaped members.

A flat part 74w extending in the rotational direction R2 of the clutch lifter cam 74 is formed in the valley parts of the groove lines 74v.

Further, the clutch lifter plate 77 has a plurality of (three) valley groove lines 77v in surface of the clutch lifter cam 74 opposite to the groove lines 74v. As shown in FIG. 29(b), a flat part 77w extending in the rotational direction R2 of the clutch lifter cam 74 is formed in the valley parts of the groove lines 77v.

More specifically, the groove lines 74v of the clutch lifter cam 74 and the groove lines 77v of the clutch lifter plate 77 have a similar valley shape. The delay mechanism is provided as the flat parts 74w formed in the groove lines 74v of the clutch lifter cam 74 and the flat parts 77w formed in the groove lines 77v of the clutch lifter plate 77.

Note that in the second modification, the flat part 77w of the clutch lifter plate 77 may not be provided.

Next, the operation of the clutch lifter cam 74 in the second modification will be described. As shown in FIG. 29(b), the release balls 79 are provided between the flat parts 74w formed in the groove lines 74v of the clutch lifter cam 74 and the flat parts 77w formed in the groove lines 77v of the clutch lifter plate 77. When the clutch lever 72 rotates in the rotational direction R1, the release balls 79 moves in the extending direction of the flat part 74w and the flat part 77w. Before the release balls 79 arrive at the end of the flat part 74w or the flat part 77w, the clutch lifter cam 74 does not or almost does not rotate. That is, the delay function works.

When the clutch lever 72 further rotates from the status where the release balls 79 have arrived at the end of the flat part 74w and the flat part 77w, the release balls 79 start to press the groove lines 77v of the clutch lifter plate 77. Accordingly, the clutch lifter plate 77 rotates in the rotational direction R2. With this arrangement, the disconnection (clutch lift) of the clutch 60 is performed.

According to the second modification, the delay mechanism is provided as the flat parts 74w formed in the valley groove lines 74v and the flat parts 77w formed in the valley groove lines 77v. Accordingly, it is possible to realize the delay mechanism with a simple structure.

Figure 31:
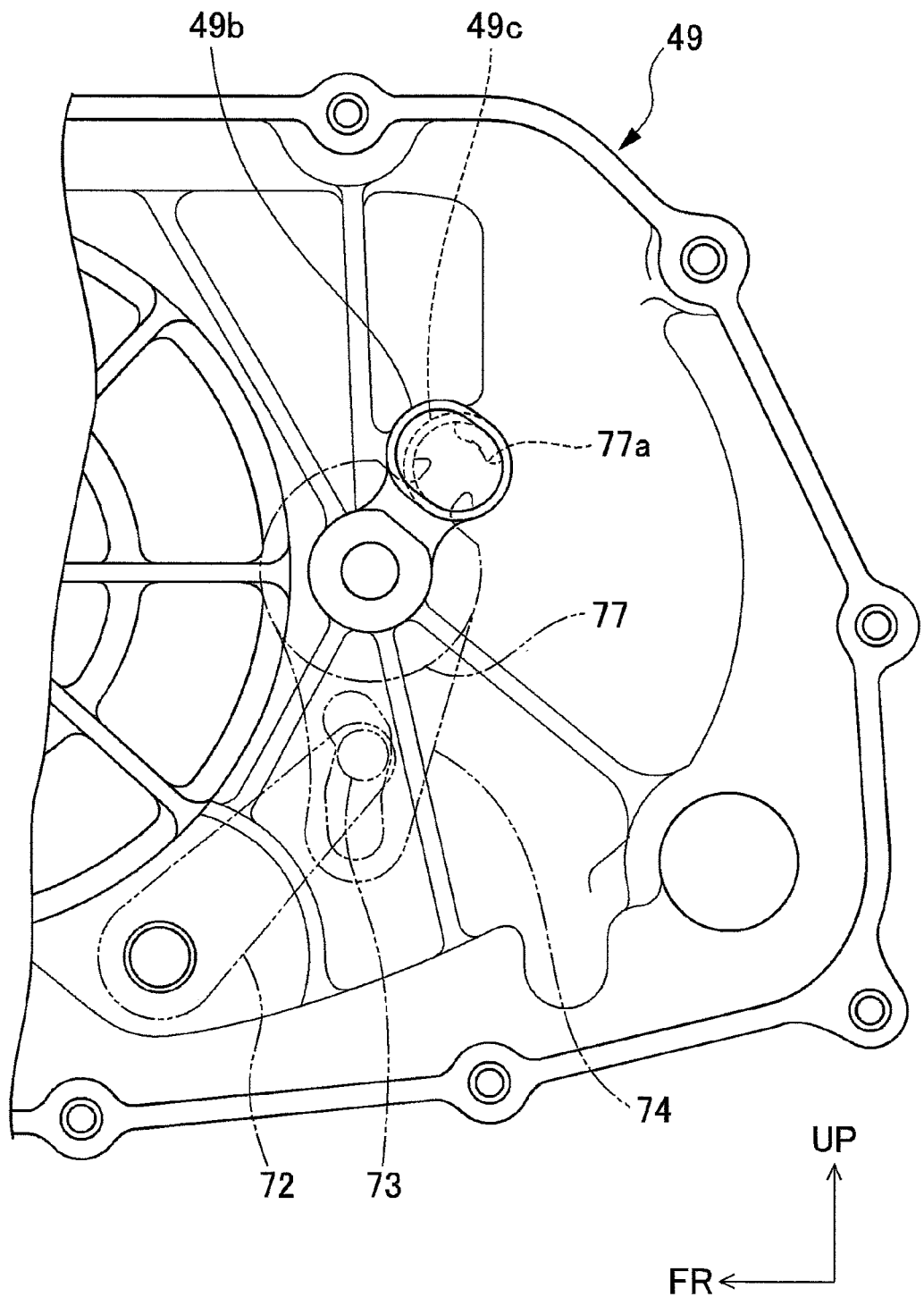
FIG. 31 is a diagram of the inside of a right side unit case cover 49 in the third modification, viewed from the left side.

FIGS. 30(a) to 30(c) are right side views showing the structures and operations of the principal parts of the delay mechanism according to a third modification. FIG. 31 is a diagram of the inside of the right side unit case cover 49, viewed from the left side in the third modification.

In the third modification, as shown in FIGS. 30(a) to 30(c), the clutch lever 72 is linked to the clutch lifter cam 74. The clutch lifter cam 74 is linked to the clutch lifter plate 77 via the three release balls 79 as ball-shaped members. As shown in FIGS. 7, 8, 30(a) and 31(a), the clutch lifter plate 77 has the anchor 77a to rotate-stopped with respect to the transmission. The delay mechanism is provided as an elliptic locking hole 49b to lock the anchor 77a.

As shown in FIGS. 30(a) to 30(c), the anchor 77a is provided in an upper part of the clutch lifter plate 77. The anchor 77a has a pair of thrust members 77b, 77b respectively at both ends of the clutch lever 72 in the rotational direction R1.

As shown in FIG. 31, the elliptic locking hole 49b is provided in left inner surface of the right-side unit case cover 49. The locking hole 49b has an elliptic shape which is long in the rotational direction R1 of the clutch lever 72. Note that a virtual line 49c shown in FIG. 31 is a virtual line indicating the shape when the locking hole has a complete round shape.

Next, the operation of the clutch lifter cam 74 in the third modification will be described. As shown in FIGS. 30(a) and 30(b), when the clutch lever 72 rotates in the rotational direction R1, the clutch lifter cam 74 is to rotate in the rotational direction R2, and at the same, the clutch lifter plate 77 is also to rotate in the rotational direction R2 via the release balls 79. However, as the locking hole 49b has an elliptic shape which is long in the rotational direction R1 of the clutch lever 72, the anchor 77a of the clutch lifter plate 77 moves in the moving direction R3 until the thrust member 77b abuts on the locking hole 49b. Thereafter, when the clutch lever 72 rotates in the rotational direction R1, the clutch lifter plate 77 rotates in the rotational direction R2 with the anchor 77a as a rotation center. More specifically, the delay function works. Then the disconnection (clutch lift) of the clutch 60 is performed.

According to the third modification, the clutch lifter plate 77 has the anchor 77a rotate-stopped with respect to the transmission, and the delay mechanism is provided as the elliptic locking hole 46b to lock the anchor 77a. Accordingly, it is possible to realize the delay mechanism with a simple structure.

FIGS. 32(a) to 32(c) are right side views showing the structures and operations of the principal parts of the delay mechanism according to a fourth modification. In the fourth modification, as shown in FIGS. 32(a) to 32(c), the clutch lever 72 is linked to the clutch lifter cam 74 with a cam surface 74e provided in the clutch lifter cam 74. The delay mechanism is provided as an idle cam 74f of the cam surface 74e.

The clutch lifter cam 74 has the cam surface 74e at its lower end. The cam surface 74e has the idle cam 74f at its central part. The idle cam 74f extends along the rotational direction R1 of the clutch lever 72. On the other hand, a top 72f of the clutch lever 72 abuts on and presses the cam surface 74e. In a status where the top 72f of the clutch lever 72 is positioned in the idle cam 74f, even when the clutch lever 72 rotates, the top 72f merely moves in the extending direction of the idle cam 74f, and the clutch lifter cam 74 does not or almost does not rotate.

On the other hand, in the cam surface 74e, a part adjacent to the idle cam 74f extends in a direction different from the rotational direction R1 of the clutch lever 72. Accordingly, in a status where the top 72f of the clutch lever 72 is positioned in the adjacent part, when the clutch lever 72 rotates, the top 72f of the clutch lever 72, interlocked with the rotation, presses the adjacent part, and the clutch lifter cam 74 immediately rotates.

Next, the operation of the clutch lifter cam 74 in the modification 4 will be described. As shown in FIG. 32(a), the top 72f of the clutch lever 72 is positioned in the idle cam 74f. As shown in FIGS. 32(a) and 32(b), when the clutch lever 72 rotates in the rotational direction R1, the top 72f moves in the extending direction of the idle cam 74f. Before the top 72f of the clutch lever 72 arrives at the end of the idle cam 74f, the clutch lifter cam 74 does not or almost does not rotate. That is, the delay function works.

When the clutch lever 72 further rotates from a status shown in FIG. 32(b) where the top 72f of the clutch lever 72 has arrived at the end of the idle cam 74f, the top 72f starts to press the cam surface 74e. Accordingly, as shown in FIG. 32(c), the clutch lifter cam 74 rotates in the rotational direction R2, and by extension, the clutch lifter plate 77 also rotates in the rotational direction R2. With this rotation, the disconnection (clutch lift) of the clutch 60 is performed.

According to the fourth modification 4, the clutch lifter cam 74 is provided with the cam surface 74e, and the delay mechanism is provided as the idle cam 74f of the cam surface 74e. Accordingly, it is possible to realize the delay mechanism with a simple structure.

Figure 33C:
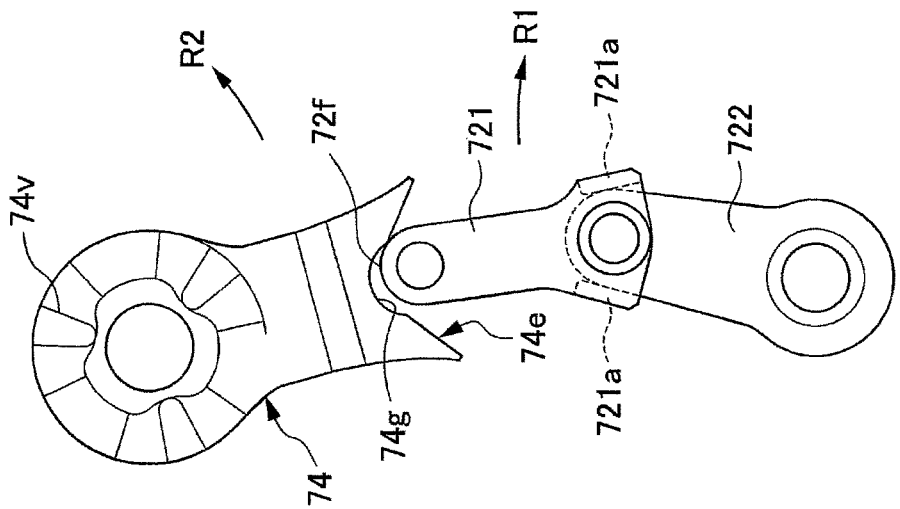
FIGS. 33(a) to 33(c) are right side views showing the structures and operations of the principal parts of the delay mechanism according to a fifth modification.
Figure 33B:
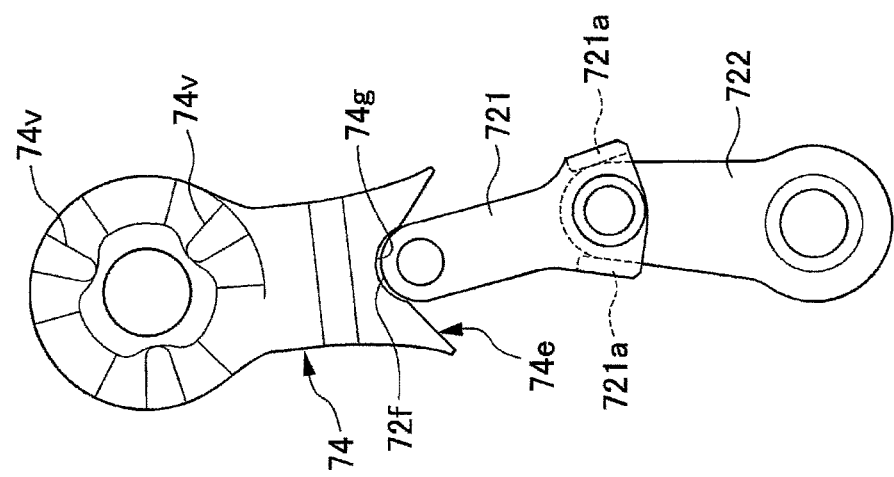
Figure 33A:
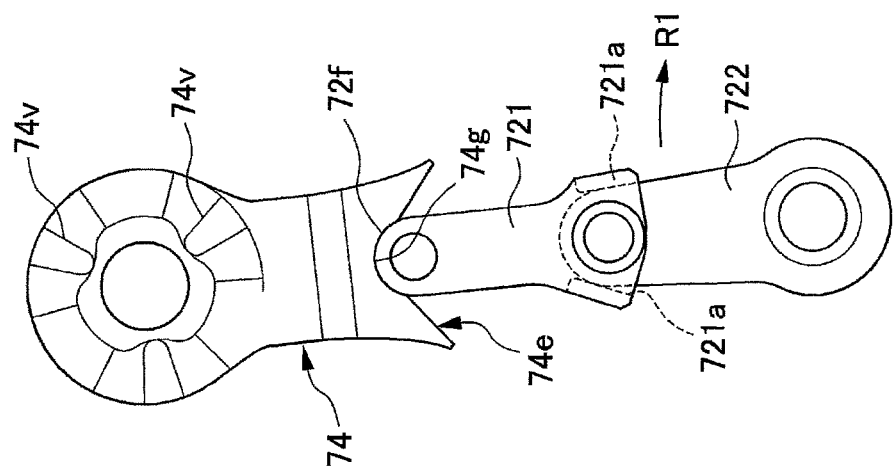

FIGS. 33(a) to 33(c) are right side views showing the structures and operations of the principal parts of the delay mechanism according to a fifth modification. In the fifth modification, as shown in FIGS. 33(a) to 33(c), the clutch lever 72 is provided as a link mechanism to which a plurality of arm members 721, 722 (first arm member 721 and second arm member 722) are connected. In the link mechanism, the one member, first arm member 721 has a stopper 721a to limit the rotational angle of the other member, second arm member 722. The delay mechanism is provided as a rotatable range for the respective first arm member 721 and the second arm member 722 in the link mechanism.

The clutch lifter cam 74 has the cam surface 74e at its lower end. The cam surface 74e has a circular-arc concave member 74g at its central part.

The clutch lever 72 is formed with the first arm member 721 on the clutch 60 side and the second arm member 722 on the shift spindle 55 side linked to each other. The first arm member 721 has the stoppers 721a, 721a at a connection part between the first arm member 721 and the second arm member 722. The stoppers 721a, 721a are provided as a pair in the rotational direction R1 of the clutch lever 72. The stopper 721a functions as a thrust member to abut on a side surface of the second arm member 722, to limit the rotational angle of the second arm member 722.

The top 72f of the clutch lever 72 (first arm member 721) abuts on the cam surface 74e (including the circular-arc concave member 74g) and presses it. In a status where the top 72f of the clutch lever 72 is positioned in the circular-arc concave member 74g, even when the clutch lever 72 rotates, the top 72f merely rotates inside the circular-arc concave member 74g, and the clutch lifter cam 74 does not or almost does not rotate.

On the other hand, in the cam surface 74e, a part adjacent to the circular-arc concave member 74g extends approximately linearly. Accordingly, in a status where the top 72f of the clutch lever 72 is positioned in the adjacent part, when the clutch lever 72 rotates, the top 72f of the clutch lever 72, interlocked with the rotation, presses the adjacent part, and the clutch lifter cam 74 rotates in the rotational direction R2.

Next, the operation of the clutch lifter cam 74 in the fifth modification will be described. As shown in FIG. 33(a), the top 72f of the clutch lever 72 is positioned in the circular-arc concave member 74g. As shown in FIGS. 33(a) and 33(b), when the second arm member 722 of the clutch lever 72 rotates, the second arm member 722 rotates until it thrusts on the stopper 721a of the first arm member 721. At this time, the clutch lifter cam 74 does not or almost does not rotate. That is, the delay function works.

When the second arm member 722 further rotates from the status where the second arm member 722 thrusts on the stopper 721a of the first arm member 721 shown in FIG. 33(b), the top 72f starts to press the cam surface 74e. Accordingly, as shown in FIG. 33(c), the clutch lifter cam 74 rotates in the rotational direction R2, and by extension, the clutch lifter plate 77 rotates in the rotational direction R2. With this arrangement, the disconnection (clutch lift) of the clutch 60 is performed.

According to the fifth modification, the clutch lever 72 is provided as a link mechanism to which the plurality of arm members 721, 722 are linked, and the delay mechanism is provided as a rotatable range for the respective arm members 721, 722 in the link mechanism. When the delay mechanism is provided on the clutch 60 side, generally, it is necessary to provide a structure to realize a large sized delay in the clutch lifter cam 74 or the like. On the other hand, it is possible to set a compact delay mechanism by forming the clutch lever 72 with a link mechanism and providing the delay mechanism as a rotatable range for the respective arm members 721, 722 in the link mechanism.

The plurality of gears of the gear array 52G is formed with a dog clutch having a dog tooth (convex member) and a dog hole (concave member), in which a rotational drive force is transmitted between coaxially adjacent gears with the engagement of the dog tooth and the dog hole in the axial direction. In this case, upon shift operation, there is a probability that a "dog abutment" status where the dog tooth is not inserted in the dog hole occurs and the shift drum 90 is not positioned in an intermittent predetermined shift position.

Further, an angle sensor (position sensor) to detect the rotational angle of the shift drum 90 is provided. Based on the detected rotational angle, it is determined what shift position the shift drum 90 is positioned, or whether or not it is not positioned in any shift position due to dog abutment or the like, i.e., it is determined whether or not the shift operation in the shift drum 90 has been normally performed.

Figure 34:
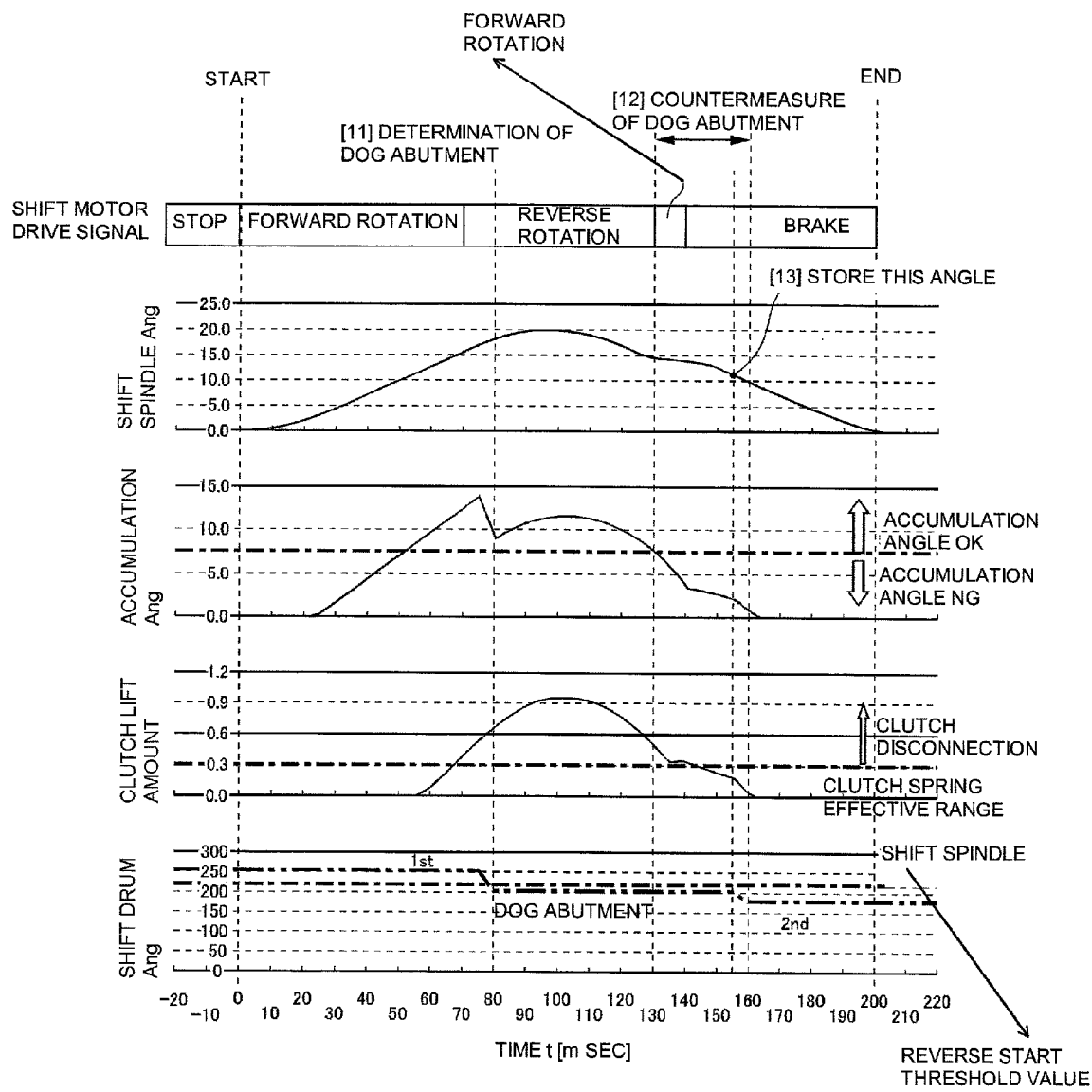
FIG. 34 is a diagram corresponding to FIG. 27, explaining shift spindle control upon occurrence of dog abutment.

FIG. 34 is a diagram corresponding to FIG. 27, explaining shift spindle control upon occurrence of dog abutment. In this example, shifting from the 1st gear to the 2nd gear will be described. When the shifting has been normally performed, as indicated in [4] in FIG. 27, the rotational angle of the shift drum 90 is quickly changed. On the other hand, when dog abutment occurs in the middle of shifting, as shown in FIG. 34, the rotational angle of the shift drum 90 is an angle between a rotational angle corresponding to the 1st gear and a rotational angle corresponding to the 2nd gear, and the angle is continued. Accordingly, in accordance with this status, it is determined that dog abutment has occurred.

Then, when the dog abutment (not positioned in any shift position) is determined, in the range indicated in [12] in FIG. 34, the following control (countermeasure) is performed.

When dog abutment is determined (see [11] in FIG. 13), the shift motor 100 is forward-rotated from the reverse status. When the amount of clutch lift is about a clutch spring effective range, the operation of the shift spindle 55 is stopped. Thereafter, the clutch 60 is gradually connected until the shift drum 90 rotates (until the position of the shift drum 90 moves to the 2nd gear position). The angle of the shift spindle 55 upon rotation of the shift drum 90 is stored (see [13] in FIG. 34), then based on the stored angle, timing of forward rotation start of the shift motor 100 is corrected.

Further, an oil temperature sensor for measurement of oil temperature is provided for the actuator to disconnect/connect the clutch 60. It is preferable that when the oil temperature measured with the oil temperature sensor is high, the operation amount of the actuator is reduced, on the other hand, when the oil temperature measured with the oil temperature sensor is low, the operation amount of the actuator is increased.

As described above, the preferred embodiments of the present invention have been described. The present invention is not limited to the above-described embodiments, but can be implemented in various forms.

For example, the vehicle to which the transmission of the present invention is applied is not limited to a motorcycle but may be other saddle-ride type vehicle than the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:
1. A vehicle transmission comprising:
a single shift spindle;

a master arm provided on the shift spindle, the master arm transmitting a rotational force of the shift spindle to a shift drum of the transmission to rotate and operate the shift drum;

a clutch lever provided on the shift spindle to operate a clutch;

an accumulation mechanism formed with a biasing member, directly covering a peripheral surface of the shift spindle, to accumulate the rotational force transmitted from the shift spindle to the master arm;

said master arm and the clutch lever being interlocked with each other;

wherein the transmission further includes a delay mechanism that delays a disconnection operation of the clutch with the clutch lever until the accumulation is completed between the shift spindle and the clutch;

an accumulation collar forming said delay mechanism, said accumulation collar having a main body fixed on said single shift spindle with a locking member projecting from a first side of the main body for engaging said accumulation mechanism, at least one tooth projects outwardly from a second side of the main body; and a rear anchor projecting from said clutch lever in a direction towards said main body, said rear anchor including at least one hole for receiving the at least one tooth projecting outwardly from the second side of the main body;

wherein said at least one tooth projecting outwardly from the main body is fitted within said at least one hole in said rear anchor to provide a lost motion between said at least one tooth and said at least one hole.

2. The vehicle transmission according to claim 1, wherein the delay mechanism functions as a lost motion mechanism not to contribute a part of the rotational angle of the shift spindle to the disconnection operation of the clutch with the clutch lever.

3. The vehicle transmission according to claim 2,
wherein the clutch lever is rotatably supported by the shift spindle; and
the delay mechanism is formed with a gap in a circumferential direction between the at least one tooth and the at least one hole.

4. The vehicle transmission according to claim 2, wherein the delay mechanism is formed with backlash in a moving direction in a clutch lifter mechanism that performs disconnection of the clutch by moving with respect to the clutch.

5. The vehicle transmission according to claim 1, wherein the biasing member is coiled spring.

6. The vehicle transmission according to claim 2,
wherein the clutch lever is linked to a clutch lifter cam that lifts the clutch to disconnect or connect the clutch via a guide hole provided in the clutch lifter cam; and
the delay mechanism is provided as a backlash hole of the guide hole.

7. The vehicle transmission according to claim 2,
wherein the clutch lever is linked to a clutch lifter cam that lifts the clutch to disconnect or connect the clutch;
the clutch lifter cam has a plurality of valley-shaped slope plates linked to a clutch lifter plate via a ball-shaped member; and
the delay mechanism is provided as a flat part formed in the valley-shaped slope plate.

8. The vehicle transmission according to claim 2,
wherein the clutch lever is linked to a clutch lifter cam that lifts the clutch to disconnect or connect the clutch;
the clutch lifter cam is linked to a clutch lifter plate via a ball-shaped member;
the clutch lifter plate has an anchor rotation-stopped with respect to the transmission; and
the delay mechanism is provided as an elliptic locking hole to lock the anchor.

9. The vehicle transmission according to claim 2,
wherein the clutch lever is linked with a clutch lifter cam that lifts the clutch to disconnect or connect the clutch with a earn surface provided in the clutch lifter cam; and
the delay mechanism is provided as an idle cam of the cam surface.

10. The vehicle transmission according to claim 2,
wherein the clutch lever is provided as a link mechanism to which a plurality of arm members are linked;
one arm member in the link mechanism has a stopper to limit a rotational angle of other arm member; and
the delay mechanism is provided as a rotatable range for the respective arm members in the link mechanism.

11. A vehicle transmission comprising:
a shift drum;
a shift spindle;
a master arm provided on the shift spindle, the master arm transmitting a rotational force of the shift spindle to the shift drum of the transmission to rotate and operate the shift drum;
a clutch lever provided on the shift spindle to selectively provide a connect operation and disconnect operation relative to a clutch, said master arm and the clutch lever being interlocked with each other;
an accumulation mechanism formed with biasing member, directly covering a peripheral surface of the shift spindle, to accumulate rotational force transmitted from the shift spindle to the master arm;
a delay mechanism for delaying the disconnect operation of the clutch with the clutch lever until the accumulation is completed between the shift spindle and the clutch;
an accumulation collar forming said delay mechanism, said accumulation collar having a main body fixed on said single shift spindle with a locking member projecting from a first side of the main body for engaging said accumulation mechanism, at least one tooth projects outwardly from a second side of the main body; and
a rear anchor projecting from said clutch lever in a direction towards said main body, said rear anchor including at least one hole for receiving the at least one tooth projecting outwardly from the second side of the main body;
wherein said at least one tooth projecting outwardly from the main body is fitted within said at least one hole in said rear anchor to provide a lost motion between said at least one doweled tooth and said at least one hole.

12. The vehicle transmission according to claim 11, wherein the delay mechanism functions as a lost motion mechanism not to contribute a part of the rotational angle of the shift spindle to the disconnection operation of the clutch with the clutch lever.

13. The vehicle transmission according to claim 12, wherein the clutch lever is rotatably supported by the shift spindle;
the delay mechanism is formed with a gap in a circumferential direction between the at least one tooth and the at least one hole.

14. The vehicle transmission according to claim 12, wherein the delay mechanism is formed with backlash in a moving direction in a clutch lifter mechanism that performs the disconnect operation of the clutch by moving with respect to the clutch.

15. The vehicle transmission according to claim 11, wherein the biasing member is a coiled spring.

16. The vehicle transmission according to claim 12,
wherein the clutch lever is linked to a clutch lifter cam that lifts the clutch to the disconnect operation or the connect operation of the clutch via a guide hole provided in the clutch lifter cam; and
the delay mechanism is provided as a backlash hole of the guide hole.

17. The vehicle transmission according to claim 12,
wherein the clutch lever is linked to a clutch lifter cam that lifts the clutch to the disconnect operation or the connect operation of the clutch;
the clutch lifter cam has a plurality of valley-shaped slope plates linked to a clutch lifter plate via a ball-shaped member; and
the delay mechanism is provided as a flat part formed in the valley-shaped slope plate.

18. The vehicle transmission according to claim 12,
wherein the clutch lever is linked to a clutch lifter cam that lifts the clutch to disconnect operation or connect operation of the clutch;
the clutch lifter cam is linked to a clutch lifter plate via a ball-shaped member;
the clutch lifter plate has an anchor rotation-stopped with respect to the transmission; and
the delay mechanism is provided as an elliptic locking hole to lock the anchor.

* * * * *